(12) United States Patent
Aizawa

(10) Patent No.: US 6,587,035 B1
(45) Date of Patent: Jul. 1, 2003

(54) PORTABLE RADIO INFORMATION TERMINAL, MESSAGE- NOTIFICATION METHOD, RECORDING MEDIUM AND MICROCOMPUTER

(75) Inventor: Masatoshi Aizawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/216,963

(22) Filed: Dec. 21, 1998

(30) Foreign Application Priority Data

Dec. 22, 1997 (JP) .............................................. 9-353484

(51) Int. Cl.⁷ ................................................ G08B 5/22
(52) U.S. Cl. ................................ 340/7.58; 340/825.22; 455/564
(58) Field of Search ........................... 340/825.22, 328, 340/392.2, 825.24, 825.25, 825.44, 7.63, 7.32, 7.58; 455/564, 566, 575; 379/354, 355, 356; 341/24, 25

(56) References Cited

U.S. PATENT DOCUMENTS 4,860,005 A * 8/1989 DeLuca ...................... 340/825
5,715,311 A * 2/1998 Sudo et al. .................. 379/428
6,014,572 A * 1/2000 Takahashi .................... 455/567

FOREIGN PATENT DOCUMENTS

JP WO96/07244 * 3/1996 ................. 379/428

* cited by examiner

Primary Examiner—Michael Horabik
Assistant Examiner—M Shimizu
(74) Attorney, Agent, or Firm—Jay H. Maioli

(57) ABSTRACT

A portable radio information terminal provided with at least two circuits, namely, an input-signal judging circuit and a message-notification-operation halting circuit. The input-signal judging circuit operates to form a judgment as to whether or not an input signal generated by an input device in the course of a message-notification operation is a rotary input signal generated by a rotary/press input device and supplies a result of the judgment to the message-notification-operation halting circuit. The message-notification-operation halting circuit continues the message-notification operation if the result of the judgment received from the input-signal judging circuit indicates that the input signal is a rotary input signal, and halts a message notifying unit currently carrying out the message-notification operation if the judgment indicates input signal is not a rotary input signal.

11 Claims, 13 Drawing Sheets

F I G. 5
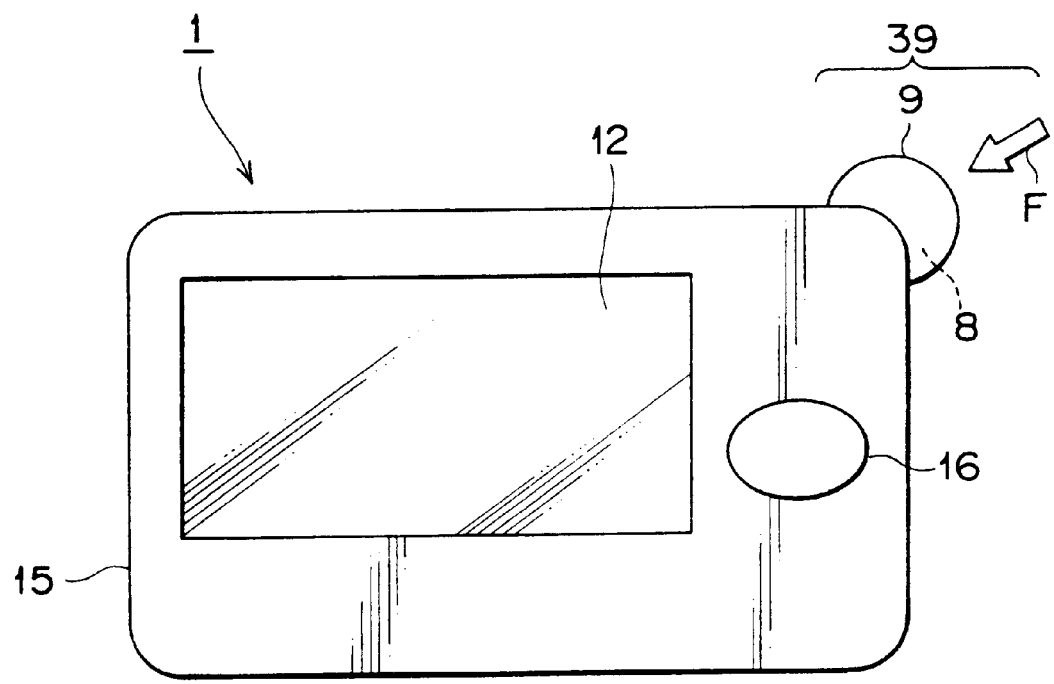

PORTABLE RADIO INFORMATION TERMINAL, MESSAGE- NOTIFICATION METHOD, RECORDING MEDIUM AND MICROCOMPUTER

BACKGROUND OF THE INVENTION

In general, the present invention relates to a portable radio information terminal and a message-notification method. More particularly, the present invention relates to a portable radio information terminal for confirming that an electric wave received from a radio base station installed at a remote location is a message signal destined for the portable radio information terminal, for notifying the user of the received message signal in the form of sound, light, mechanical vibration or another form to make the user aware of the arrival of the message signal and for displaying a message conveyed in the signal on an embedded screen display unit and, in particular, relates to a portable radio information terminal such as a pager and a message-notification method adopted in the pager.

A portable radio information terminal is a handy and portable apparatus that is capable of functioning as a terminal of a communication network. In recent years, there have been implemented portable radio information terminals with a variety of configurations and functions to meet a rapidly growing demand in a wide range of applications in the field of information communication.

An example of such a portable radio information terminal is a pager which is widely used for carrying out communications of radio signals.

An early pager generates bell sound when a calling signal is received from a radio base station. A radio calling signal is capable of calling the user carrying this pager even if the user is present at a separated place. The radio calling signal is normally used to urge the user to respond to the calling signal by using a wire telephone closest to the user.

By the way, a signal generated by the radio base station is not merely ended with such a calling signal. A signal generated by the radio base station is also capable of conveying information. On the pager side, on the other hand, information conveyed by an incoming signal is decoded and a result of the decoding is stored in a memory unit and displayed on a liquid-crystal display panel as a message. A pager having functions to decode, store and display such information has been developed and widely used at the present time.

Such a pager is provided with a message notifying unit having a function of generating ringing sound of a bell to notify the user of an incoming message or a time set in advance or to give the user a warning indicating the fact that the voltage of the battery has become lower than a predetermined value.

The message notifying unit is activated when a call arrives, a time set in advance is reached or the voltage of the battery becomes lower than a predetermined level and starts to generate ringing sound of the bell. The message notifying unit notifies the user of such an event for a predetermined period of time, then halts the operation to notify the user as the period of time lapses. As an alternative, the message notifying unit halts the operation to notify the user of such an event when the user acknowledges the notification of the arrival of such a call or such an alarm by entering a command to halt the operation while the bell is ringing.

While the ringing sound of a bell used as a message is an effective message notifying means, it is feared that the user can not hear the sound of the bell notifying the incoming message or the calling sound in the event of an incoming call in some cases when the pager is used outdoors or at a trip destination or, in particular, in a noisy environment.

At a place such as a movie theater or a conference hall, on the other hand, there is not much noise. At such a place, however, notifying sound of incoming message or calling sound will be a disturbance to the atmosphere.

In order to solve the problems described above, the message notifying unit is generally designed into a configuration including a vibration function of a vibrator for informing the user of a message by vibration in place of ringing sound of a bell. As an alternative, the message notifying unit is designed into a configuration which allows the user to manually operate an input device to select either ringing sound of a bell or vibration of a vibrator as a message-notification means.

Since the user normally uses a portable radio information terminal by carrying the portable radio information terminal all the time, the portable radio information terminal is required to have a small size and, thus, a small number of components.

In addition, the portable radio information terminal must also allow the user to halt an operation of ringing the bell to indicate reception of an incoming information signal in the event of such a signal by gripping the terminal quickly as well as easily without triggering a malfunction.

In order to satisfy the requirements described above, there has been developed a rotary/press input device comprising a rotary input operation unit and a press switch.

Such a rotary/press input device is put to practical use typically as a jog dial or a rotary encoder. The rotary input operation unit is implemented by a disc-shape knob built into a single assembly with the press switch. The disc-shape knob can be rotated with a high degree of freedom. The press switch generates an intermittent input signal when pressed along with the disc-shape knob.

Two groups of input signals can thus be resulted in with ease when the disc-shape knob is rotated in the clockwise (right) direction or the counterclockwise (left) direction respectively. On the top of that, an intermittent input signal is generated by pressing the disc-shape knob. Thus, the number of switch devices is reduced. As a result, the rotary/press input device can be made small in size and the operatability thereof is improved.

The contemporary portable radio information terminal has a configuration employing a jog dial or a rotary encoder therein, by operating the jog dial or the rotary encoder, it is possible to halt an operation to ring the bell to notify reception of an incoming information signal in the event of such a signal.

By the way, the user normally uses a portable radio information terminal of this type by carrying the portable radio information terminal all the time. More specifically, the user puts the portable radio information terminal in a pocket or a bag or attaches the portable radio information terminal to a belt wound around the belly in many cases.

Thus, when the user gets on or off a train, takes a seat or gets on and off a car, for example, it is quite within the bounds of possibility that an external force is accidentally applied to an operation unit of the rotary/press input device, inadvertently putting the portable radio information terminal into an unexpected state of operation in some cases. If an input signal is generated by such an inadvertent external force, the bell which should naturally generate ringing sound continuously may be put in a halted state, giving rise to a problem that the user is not notified of the incoming call.

SUMMARY OF THE INVENTION

It is thus an object of the present invention addressing the problems encountered in a portable radio information terminal having the related-art message-notification configuration described above to provide a portable radio information terminal capable of operating with a high degree of reliability by eliminating the effect of an unexpected external force and to provide a message-notification method for the portable radio information terminal.

According to a message-notification method for a portable radio information terminal of the present invention including a rotary/press input device comprising a rotary operation unit and a press operation unit, and a non-rotary input device, if an input signal generated in the course of a message-notification operation is an input signal determined in advance, that is, if an input signal generated in the course of a message-notification operation is one of three input signals, namely, a rotary input signal generated by the rotary operation unit, an intermittent input signal generated by the press operation unit and a non-rotary input signal generated by the non-rotary input unit as a result of a non-rotary operation carried out on the non-rotary input unit, the message-notification operation is continued and, if an input signal generated in the course of a message-notification operation is neither the rotary input signal, the intermittent input signal nor the non-rotary input signal, the message-notification operation is halted.

Thus, a message-notification operation can be continued or halted depending on whether or not there has been generated an input signal by an input device of the portable radio information terminal wherein any input device can be set arbitrarily as an input device for generating an input signal to halt a message-notification operation or as an input device for generating no input signal to halt a message-notification operation. As a result, the message-notification method provides an effect that, by setting an input device prone to the effect of an inadvertent external force as an input device for generating no input signal to halt a message-notification operation and setting an input device hardly affected by an inadvertent external force as an input device for generating an input signal to halt a message-notification operation, the effect of halting the message-notification operation as a result of an inadvertent external force can be eliminated with ease.

According to a message-notification method for a portable radio information terminal of the present invention, a rotary input signal is used as a predetermined input signal. Thus, the rotary input signal resulting from a rotation of the rotary operation unit employed in the rotary/press input device which is prone to the effect of an inadvertent external force can be ignored in processing to determine whether or not to halt a message-notification operation. As a result, the message-notification method is capable of effectively avoiding a malfunction accidentally halting a message-notification operation by ignoring a rotary input signal in the processing to determine whether or not to halt a message-notification operation in case such a rotary input signal is generated when the rotary operation unit is rotated by inadvertent application of an external force in the course of a message-notification operation.

According to a message-notification method for a portable radio information terminal of the present invention, a rotary input signal generated by a rotary operation unit or an intermittent input signal generated by a press operation unit is used as the predetermined input signal. Thus, the rotary input signal resulting from a rotation of the rotary operation unit or the intermittent input signal resulting from a pressure applied to the press operation unit employed in the rotary/press input device which is prone to the effect of an inadvertent external force can be ignored in processing to determine whether or not to halt a message-notification operation. As a result, the message-notification method is capable of effectively avoiding a malfunction accidentally halting a message-notification operation by ignoring a rotary input signal or an intermittent input signal in the processing to determine whether or not to halt a message-notification operation in case such a rotary input signal or such an intermittent input signal is generated respectively when the rotary operation unit is rotated or when the press operation unit is accidentally pressed by inadvertent application of an external force in the course of a message-notification operation.

In a portable radio information terminal according to the present invention, an input-signal judging means embedded therein at least forms a judgment as to whether or not an input signal generated by an input device in the course of a message-notification operation is the rotary input signal generated by the rotary/press input means, and a message-notification-operation halting means also embedded therein does not halt, but instead continues the message-notification operation if a result of the judgment formed by the input-signal judging means indicates that the input signal generated by the input device is the rotary input signal generated by the rotary/press input means.

Thus, the rotary input signal resulting from a rotation of the rotary operation unit employed in the rotary/press input device which is prone to the effect of an inadvertent external force can be ignored in processing to determine whether or not to halt a message-notification operation. As a result, the portable radio information terminal is capable of effectively avoiding a malfunction of accidentally halting a message-notification operation by ignoring a rotary input signal in the processing to determine whether or not to halt a message-notification operation in case such a rotary input signal is generated when the rotary operation unit is rotated by inadvertent application of an external force in the course of a message-notification operation.

In a portable radio information terminal according to the present invention, the input-signal judging means is used for at least forming a judgment as to whether or not an input signal generated by the input device in the course of a message-notification operation is a rotary input signal generated by the rotary/press input means or an intermittent input signal generated by the press input means, and the message-notification-operation halting means is used for continuing the message-notification operation if a result of the judgment formed by the input-signal judging means indicates that the input signal generated by the input device is the rotary input signal generated by the rotary/press input means or the intermittent input signal generated by the press input means, and for halting the message notifying unit currently carrying out the message-notification operation if a result of the judgment formed by the input-signal judging means indicates that the input signal generated by the input device is neither the rotary input signal generated by the rotary/press input means nor the intermittent input signal generated by the press input means.

Thus, the rotary input signal resulting from a rotation of the rotary operation unit or the intermittent input signal resulting from a pressure applied to the press operation unit employed in the rotary/press input device which is prone to the effect of an inadvertent external force can be ignored in processing to determine whether or not to halt a message-notification operation. As a result, the portable radio information terminal is capable of effectively avoiding a malfunction accidentally halting a message-notification operation by ignoring a rotary input signal or an intermittent input signal in the processing to determine whether or not to halt a message-notification operation in case such a rotary input signal or such an intermittent input signal is generated respectively when the rotary operation unit is rotated or when the press operation unit is accidentally pressed by inadvertent application of an external force in the course of a message-notification operation.

A recording medium according to the present invention records at least two means each as a program that can be fetched and executed by a computer. The two means recorded in the recording medium are an input-signal judging means for at least forming a judgment as to whether or not an input signal generated by an input device in the course of a message-notification operation is an input signal determined in advance, and a message-notification-operation halting means for continuing the message-notification operation if a result of the judgment formed by the input-signal judging means indicates that the input signal generated by the input device is the input signal determined in advance and for halting a message notifying unit currently carrying out the message-notification operation if a result of the judgment formed by the input-signal judging means indicates that the input signal generated by the input device is not the input signal determined in advance.

As a result, by incorporating the recording medium into a portable radio information terminal equipped with CPU (central processing unit), the input device, an image displaying unit and a memory unit for storing messages as a memory for storing operating procedures each executable by the central processing unit and by letting the central processing unit sequentially execute the means each as an operating procedure, it is possible to provide the portable radio information terminal with functions to form a judgment as to whether or not an input signal generated by the input device in the course of a message-notification operation is an input signal determined in advance, and to continue the message-notification operation if a result of the judgment indicates that the input signal generated by the input device is the input signal determined in advance and to halt the message notifying unit currently carrying out the message-notification operation if a result of the judgment indicates that the input signal generated by the input device is not the input signal determined in advance.

A microcomputer according to the present invention has a storage unit for storing at least two means each as a program that can be fetched and executed by a central processing unit of the microcomputer. The two means stored in the storage unit are an input-signal judging means for at least forming a judgment as to whether or not an input signal generated by an input device in the course of a message-notification operation is an input signal determined in advance, and a message-notification-operation halting means for continuing the message-notification operation if a result of the judgment formed by the input-signal judging means indicates that the input signal generated by the input device is the input signal determined in advance and for halting the message notifying unit currently carrying out the message-notification operation if a result of the judgment formed by the input-signal judging means indicates that the input signal generated by the input device is not the input signal determined in advance.

As a result, by using the microcomputer in conjunction with components such as a communication mechanism unit, a memory unit for storing received messages, an input device operated for entering inputs, an image displaying unit for displaying information such as a message and a power-supply circuit, it is possible to implement a portable radio information terminal having a simple configuration for executing functions to form a judgment as to whether or not an input signal generated by the input device in the course of a message-notification operation is an input signal determined in advance, and to continue the message-notification operation if a result of the judgment indicates that the input signal generated by the input device is the input signal determined in advance and to halt the message notifying unit currently carrying out the message-notification operation if a result of the judgment indicates that the input signal generated by the input device is not the input signal determined in advance.

According to the present invention, in an message-notification method provided for a portable radio information terminal, wherein the rotary/press input means comprises a rotary operation unit for generating a rotary input signal and a press operation unit for generating an intermittent input signal, a message-notification operation being carried out currently is halted when at least two of the three input signals, namely, the non-rotary input signal, the rotary input signal and the intermittent input signal, are generated at the same time in the course of the information-notification operation.

As described above, a message-notification operation which has been going on so far is halted, only when at least two of the three input signals are generated at the same time during the operation. Even if a member of the input device is actuated by an inadvertent external force applied accidentally, it is possible that it affects onto another member. When an inadvertent external force actuates two or more members of the input device at the same time, the portable radio information terminal is capable of effectively solving a problem of an external force incorrectly halting a message-notification operation even if a member is affected unexpectedly by the external force.

A portable radio information terminal according to the present invention is provided with at least two means, namely, a simultaneous-multiple-inputs judging means for forming a judgment as to whether or not at least two of the three input signals, namely, the non-rotary input signal, the rotary input signal and the intermittent input signal, have been generated at the same time in the course of an information-notification operation, and a message-notification-operation halting means for continuing the message-notification operation if a result of the judgment formed by the simultaneous-multiple-inputs judging means indicates that at least two of the three input signals have not been generated at the same time in the course of the information-notification operation and for halting a message notifying unit currently carrying out the message-notification operation if a result of the judgment formed by the simultaneous-multiple-inputs judging means indicates that at least two of the three input signals have been generated at the same time in the course of the information-notification operation.

As described above, the simultaneous-multiple-inputs judging means allows the message-notification operation not to be halted unless at least two of the three input signals have been generated at the same time in the course of the message-notification operation. Even if a member of the input device is actuated by an inadvertent external force applied accidentally, it is possible that it affects onto another member. When an inadvertent external force actuates two or more members of the input device at the same time, the portable radio information terminal is capable of effectively solving a problem of an external force incorrectly halting a message-notification operation even if a member is affected unexpectedly by the external force, thus obtaining a highly reliable portable radio information terminal without malfunction.

A recording medium according to the present invention is used for recording at least two means each as a program that can be fetched and executed by a computer typically employed in a portable radio information terminal. The two means recorded in the recording medium are a simultaneous-multiple-inputs judging means for forming a judgment as to whether or not at least two of the three input signals, namely, the non-rotary input signal, the rotary input signal and the intermittent input signal, have been generated at the same time in the course of an information-notification operation, and a message-notification-operation halting means for continuing the message-notification operation if a result of the judgment formed by the simultaneous-multiple-inputs judging means indicates that at least two of the three input signals have not been generated at the same time in the course of the information-notification operation and for halting a message notifying unit currently carrying out the message-notification operation if a result of the judgment formed by the simultaneous-multiple-inputs judging means indicates that at least two of the three input signals have been generated at the same time in the course of the information-notification operation.

As a result, by incorporating the recording medium into a portable radio information terminal equipped with the input device, a central processing unit, an image displaying unit and a memory for storing messages as a memory for storing operating procedures each executable by the central processing unit and by letting the central processing unit sequentially execute the means each as an operating procedure, it is possible to provide the portable radio information terminal with functions to form a judgment as to whether or not at least two of the three input signals, namely, the non-rotary input signal, the rotary input signal and the intermittent input signal, have been generated at the same time in the course of an information-notification operation, and to continue the message-notification operation if a result of the judgment indicates that at least two of the three input signals have not been generated at the same time in the course of the information-notification operation and to halt a message notifying unit currently carrying out the message-notification operation if a result of the judgment indicates that at least two of the three input signals have been generated at the same time in the course of the information-notification operation.

Provided with an embedded central processing unit and an embedded storage unit for storing procedures as programs which can each be fetched and executed by a central processing unit, a microcomputer according to the present invention typically employed in a portable radio information terminal provided with the programs stored in the storage unit at least includes two means, namely, a simultaneous-multiple-inputs judging means for forming a judgment as to whether or not at least two of the three input signals, namely, the non-rotary input signal, the rotary input signal and the intermittent input signal, have been generated at the same time in the course of an information-notification operation, and a message-notification-operation halting means for continuing the message-notification operation if a result of the judgment formed by the simultaneous-multiple-inputs judging means indicates that at least two of the three input signals have not been generated at the same time in the course of the information-notification operation and for halting the message notifying unit currently carrying out the message-notification operation if a result of the judgment formed by the simultaneous-multiple-inputs judging means indicates that at least two of the three input signals have been generated at the same time in the course of the information-notification operation.

Thus, by incorporating the microcomputer in a portable radio information terminal along with components such as a communication mechanism unit, a memory unit for storing received messages, the input device including the rotary/press input device, an image displaying unit for displaying information such as a message and a power-supply circuit, it is possible to implement the portable radio information terminal with a simple configuration for sequentially executing functions by the central processing unit to form a judgment as to whether or not at least two of the three input signals, namely, the non-rotary input signal, the rotary input signal and the intermittent input signal, have been generated at the same time in the course of an information-notification operation, and to continue the message-notification operation if a result of the judgment indicates that at least two of the three input signals have not been generated at the same time in the course of the information-notification operation and to halt a message notifying unit currently carrying out the message-notification operation if a result of the judgment indicates that at least two of the three input signals have been generated at the same time in the course of the information-notification operation.

BRIEF DESCRIPTION OF THE DRAWINGS

FIG. 5 is a diagram showing a front view of the external appearance of the portable radio information terminal shown in FIGS. 1 and 2.

DETAILED DESCRIPTION OF THE PREFERRED EMBODIMENTS

The present invention will become more apparent from the following detailed description of some preferred embodiments with reference to the accompanying diagrams. It should be noted that the embodiment described below is no more than a preferred example showing the essential configuration and operation of the present invention. Thus, the embodiment may have limitations which are desirable from the technological configuration point of view. However, the scope of the present invention is not limited to the embodiment unless otherwise specified explicitly in a description to limit the scope of the present invention.

Figure 1:
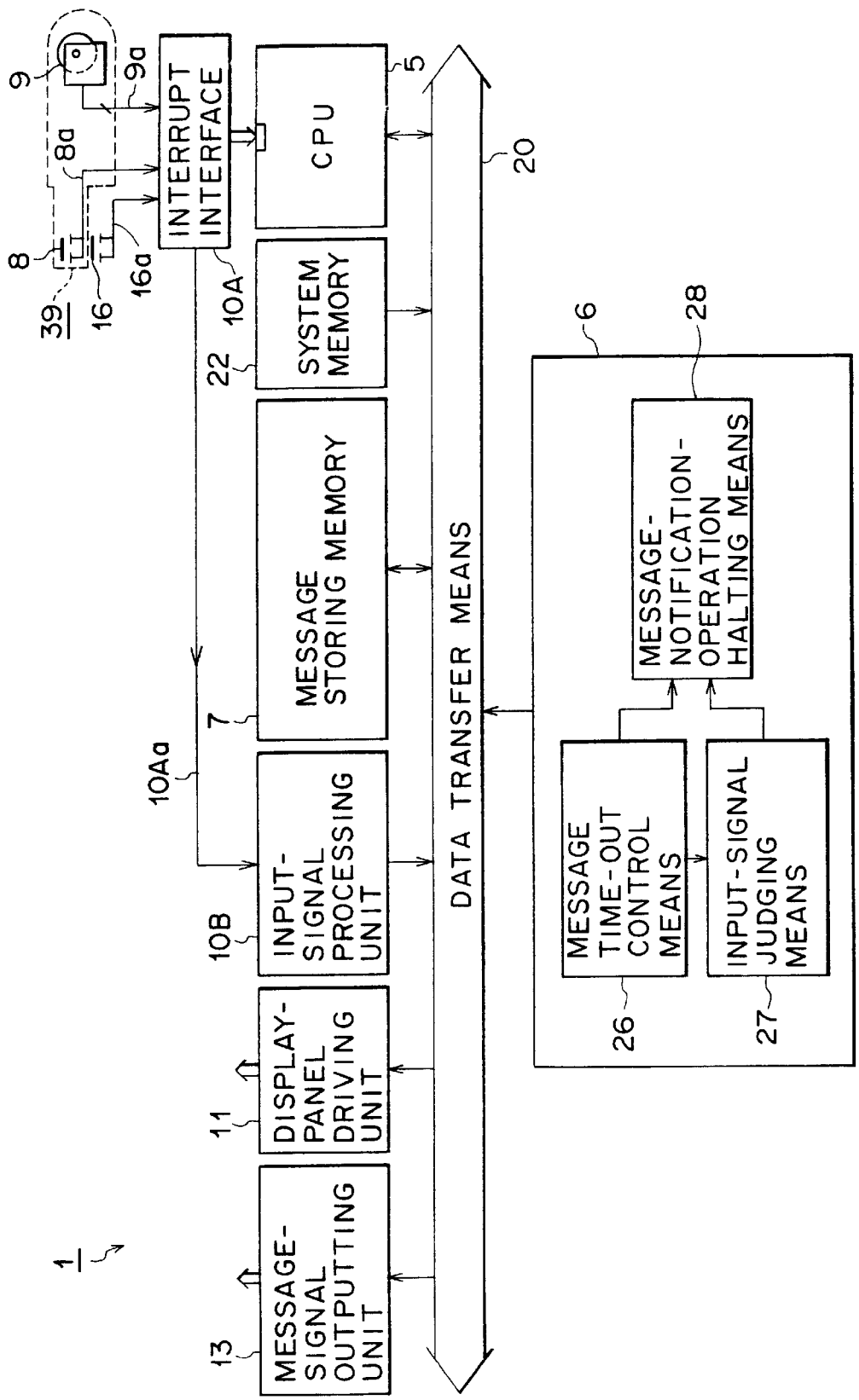
FIG. 1 is a block diagram showing the configuration of main components composing a pager used as a portable radio information terminal implemented by a first embodiment of the present invention.
Figure 2:
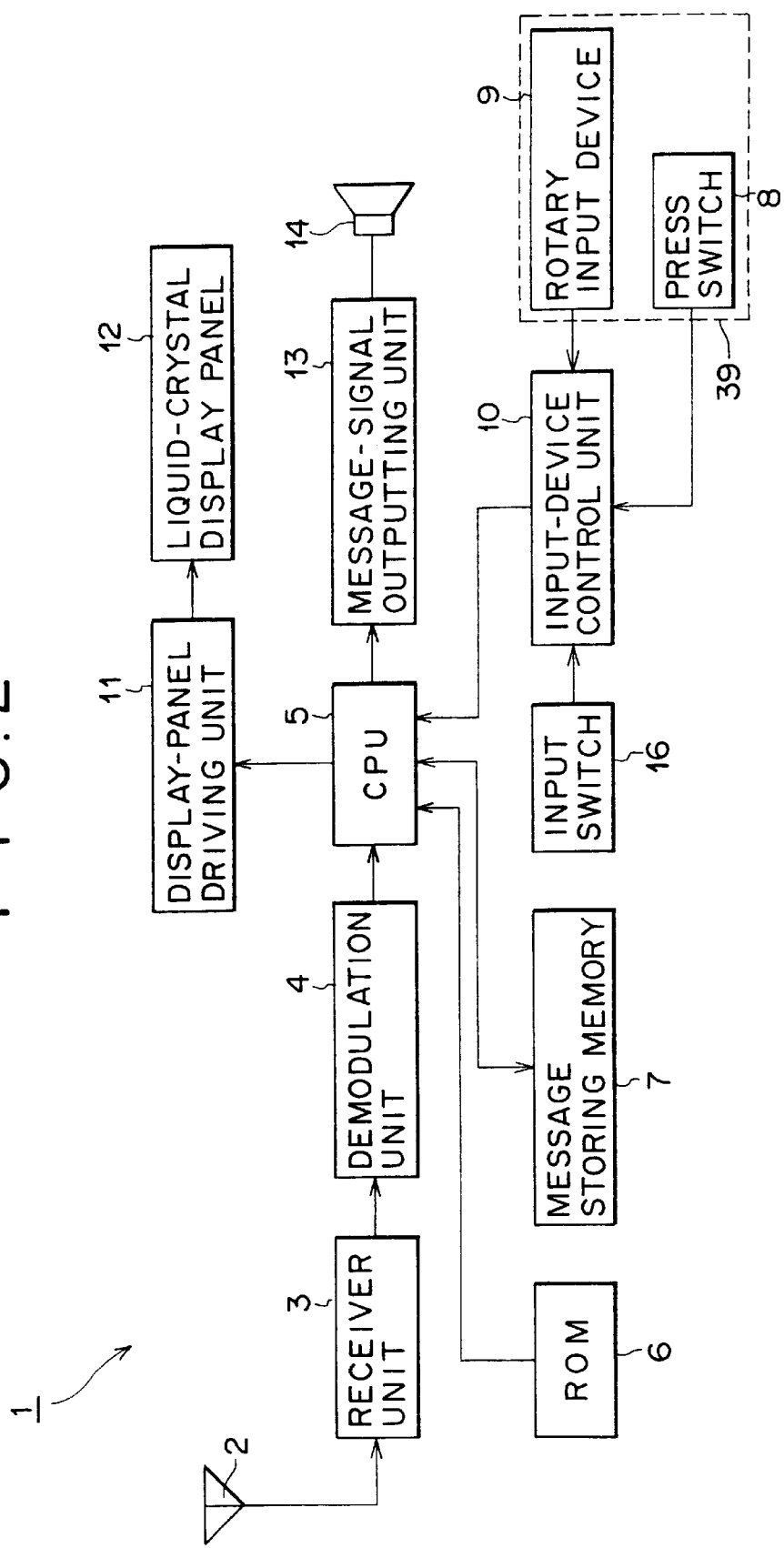
FIG. 2 is a block diagram showing a complete configuration of the portable radio information terminal shown in FIG. 1.

FIG. 1 is a block diagram showing the configuration of main components composing a portable radio information terminal implemented by a first embodiment of the present invention. FIG. 2 is a block diagram showing a complete configuration of the portable radio information terminal.

FIG. 5 is a diagram showing a front view of the external appearance of the portable radio information terminal shown in FIGS. 1 and 2.

Used as a pager, the portable radio information terminal 1 provided by the present invention serves as a communication means which comprises an antenna 2, a receiver unit 3 and a demodulation unit 4 as shown in FIG. 2. The antenna 2 receives a radio wave conveying an information signal from a transmitter such as a radio base installed at a remote location. Connected to the antenna 2, the receiver unit 3 amplifies and detects the signal received by the antenna 2. Connected to the receiver unit 3, the demodulation unit 4 serves as a decoder for decoding a signal output by the receiver unit 3 to produce code information.

In addition, the modulation unit 4 also has an A/D converter for generating digital information. The modulation unit 4 further has a function to compare the code information obtained as a result of decoding with an ID code to form a judgment as to whether or not the received information signal is indeed a signal destined for this portable radio information terminal 1. The ID code is recorded in advance in an ID memory unit implemented typically by an EEPROM. It should be noted that the ID memory unit itself is not shown in the figure. A signal output by the demodulation unit 4 is supplied to a CPU 5.

The CPU 5 is further connected to a message storing memory 7 which is implemented typically by an SRAM.

The CPU 5 is a component for carrying out data processing and input/output processing. To put it in detail, the CPU 5 executes a variety of programs or executable procedures stored in advance in ROM units internal and external to the CPU 5 to read in an input signal received from an input device to be described later, to write data into a file and arrange files on the message storing memory 7, to create or update a TOC (Table of Contents), to read out a file from the message storing memory 7 and to control all operations of the portable radio information terminal 1 including an operation to display information such as a message indicating existence of an incoming signal and warnings including an alarm indicating a voltage abnormality on a display screen.

A message included in the code information generated by the demodulation unit 4 from a received signal is written and stored in the message storing memory 7. The message is read out back from the message storing memory 7 to be displayed on a display screen. The message storing memory 7 can also be implemented by a non-volatile storage device such as a flash memory and an EEPROM in addition to the SRAM described above.

Operated by a user, the input device mentioned above comprises a rotary input device 9 and a press switch 8 forming into a single assembly with the rotary input device 9. The single assembly comprising the press switch 8 and the rotary input device 9 constitutes a rotary/press input device 39 which will be described in detail later.

The rotary/press input device 39 operated by a user also has an input switch 16. The input switch 16 is a non-rotary input device which is actuated by a non-rotary operation. When a non-rotary operation such as a pressure or a touch is given to on the input switch 16, an input signal 16a is generated. The input signal 16a generated by the input switch 16 is referred to as a non-rotary input signal. In this embodiment, the input switch 16 is used as a device for entering a command to halt a message-notification operation to be described later.

The rotary input device 9, the press switch 8 and the input switch 16 are connected to an input-device control unit 10 which is connected to the CPU 5.

The CPU 5 is connected to a display-panel driving unit 11. Also connected to the display-panel driving unit 11 is a liquid-crystal display panel 12 as a display screen. The display-panel driving unit 11 and the liquid-crystal display panel 12 form an image displaying unit.

A display signal output by the CPU 5 is transmitted to the display-panel driving unit 11 which supplies a driving signal to the liquid-crystal display panel 12. Driven by the driving signal, the liquid-crystal display panel 12 forms a screen.

The CPU 5 is also connected to a message-signal outputting unit 13 which is connected to a speaker 14 used as an audio-message device. The CPU 5 outputs an operation signal to drive the speaker 14 by way of the message-signal outputting unit 13 for converting the operation signal into an audio signal for driving the speaker 14.

The CPU 5, the input-device control unit 10 and other components described above constitute a control means. Main components of the portable radio information terminal 1 shown in FIG. 1 are described as follows.

As shown in the figure, connected to a data bus serving as a data transfer means 20 are components such as the CPU 5, a system memory 22, a ROM 6, the message storing memory 7, an input-signal processing unit 10B, the display-panel driving unit 11 and the message-signal outputting unit 13.

Thus, the CPU 5 is capable of exchanging data with the system memory 22, the ROM 6, the message storing memory 7, the input-signal processing unit 10B, the display-panel driving unit 11 and the message-signal outputting unit 13 through the data transfer means 20.

The system memory 22 is used for storing a variety of control procedures for controlling all operations of the portable radio information terminal 1 in the form of programs executable by the CPU 5.

On the other hand, the ROM 6 is used for storing mainly a variety of execution procedures of application-related softwares in the form of programs executable by the CPU 5. The ROM 6 is implemented by a storage device such as a read-only MOS memory, a flash memory, or the like.

Figure 3:
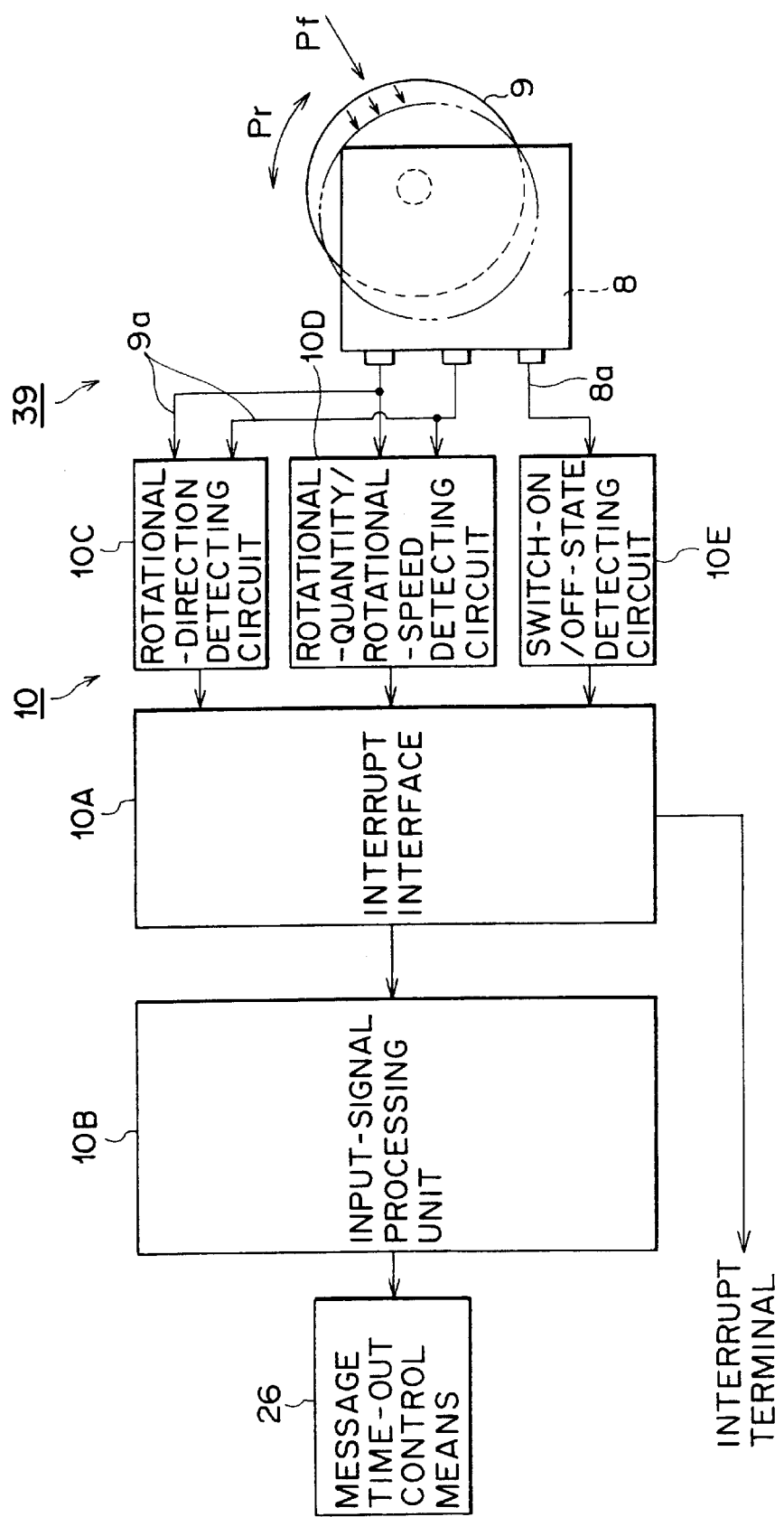
FIG. 3 is a diagram showing a typical configuration of a rotary/press input device employed in the portable radio information terminal provided by the present invention.

FIG. 3 is a diagram showing a typical configuration of the rotary/press input device 39. As shown in the figure, the rotary/press input device 39 provided by the embodiment includes a rotary input device 9 used as a rotary operation unit and a press switch 8 serving as a press operation unit which are built into a single assembly.

The rotary input device 9 has a disc-shape knob which can be rotated in a direction indicated by an arrow Pr. When an input operation is carried out by rotating the rotary input device 9 in the clockwise or counterclockwise direction, a signal 9a dependent on the direction is generated. This signal is referred to as a rotary input signal 9a.

When the knob is pressed in a direction indicated by an arrow Pf, the press switch 8 makes a stroke movement. As a result, an intermittent input signal 8a is generated. This intermittent input signal 8a is referred to an intermittent input signal 8a.

Information on the rotational direction of the knob of the rotary input device 9 is detected by a rotational-direction detecting circuit 10C employed in the input-device control circuit 10 through a terminal as a signal which is then supplied to an interrupt interface 10A. The interrupt interface 10A in turn generates an interrupt signal based on the signal supplied thereto and forms a signal 10A*a* shown in FIG. 1. The signal 10A*a* conveying the information on the rotational direction is supplied to the input-signal processing unit 10B.

The input-signal processing unit 10B receives the signal 10A*a* and passes it to the data transfer means 20 immediately as it is or after holding the signal 10A*a*.

The information is used in execution of a means for determining the rotational direction of the rotary device. It should be noted that this means is stored in the ROM 6, being shown in none of the figures.

In the case of an input-signal processing unit 10B that outputs the signal 10A*a* immediately without holding it, the information on the rotational direction of the knob is used only once. That is to say, an operation carried out on the knob corresponds to one execution of processing.

In the case of an input-signal processing unit 10B that outputs the signal 10A*a* after holding it, on the other hand, the information on the rotational direction of the knob can be used repeatedly. That is to say, with the knob put in a state of being rotated continuously, processing is carried out repetitively.

In addition, information on the rotational quantity and the rotational speed of the knob of the rotary input device 9 is obtained from a rotational-quantity/rotational-speed detecting circuit 10D employed in the input-device control circuit 10 through a terminal as a signal which is then similarly supplied to the interrupt interface 10A as shown in FIG. 3. The information is used in processing carried out thereafter.

As shown in FIG. 3, an intermittent input signal 8a generated by the press switch 8 is obtained from a switch-on/off-state detecting circuit 10E employed in the input-device control circuit 10 through a terminal as a signal which is then likewise supplied to the interrupt interface 10A.

In addition, the rotary input device 9 and the press switch 8 are designed so that they can be operated independently of each other. They can also be operated simultaneously as well.

Implemented by typically by a jog dial or a rotary encoder, the rotary input device 9 employed in the rotary/press input device 39 described above functions as an input device operated by the user for supplying a command signal for controlling operations in general including a change command signal to change a number displayed on the screen and a select signal to specify a specific portion on the screen. On the other hand, the press switch 8 employed in the rotary/press input device 39 described above functions as an input device operated by the user for supplying a signal used mainly for confirming a selected portion or a displayed number and typically for causing the operation of the portable radio information terminal 1 to transit from one mode to another.

The rotary input signal 9a, the intermittent input signal 8a and the non-rotary input signal 16a generated by the rotary input device 9, the press switch 8 and the input switch 16 respectively are each converted by the interrupt interface 10A into an interrupt signal supplied to the CPU 5 by way of an interrupt receiving terminal.

In this configuration, when either one of the rotary input signal 9a, the intermittent input signal 8a or the non-rotary input signal 16a is generated as a result of an operation carried out on the rotary input device 9, the press switch 8 or the input switch 16 respectively, an interrupt signal is supplied by the interrupt interface 10A to the CPU 5, causing the CPU 5 to change to an interrupt processing phase.

Figure 4:
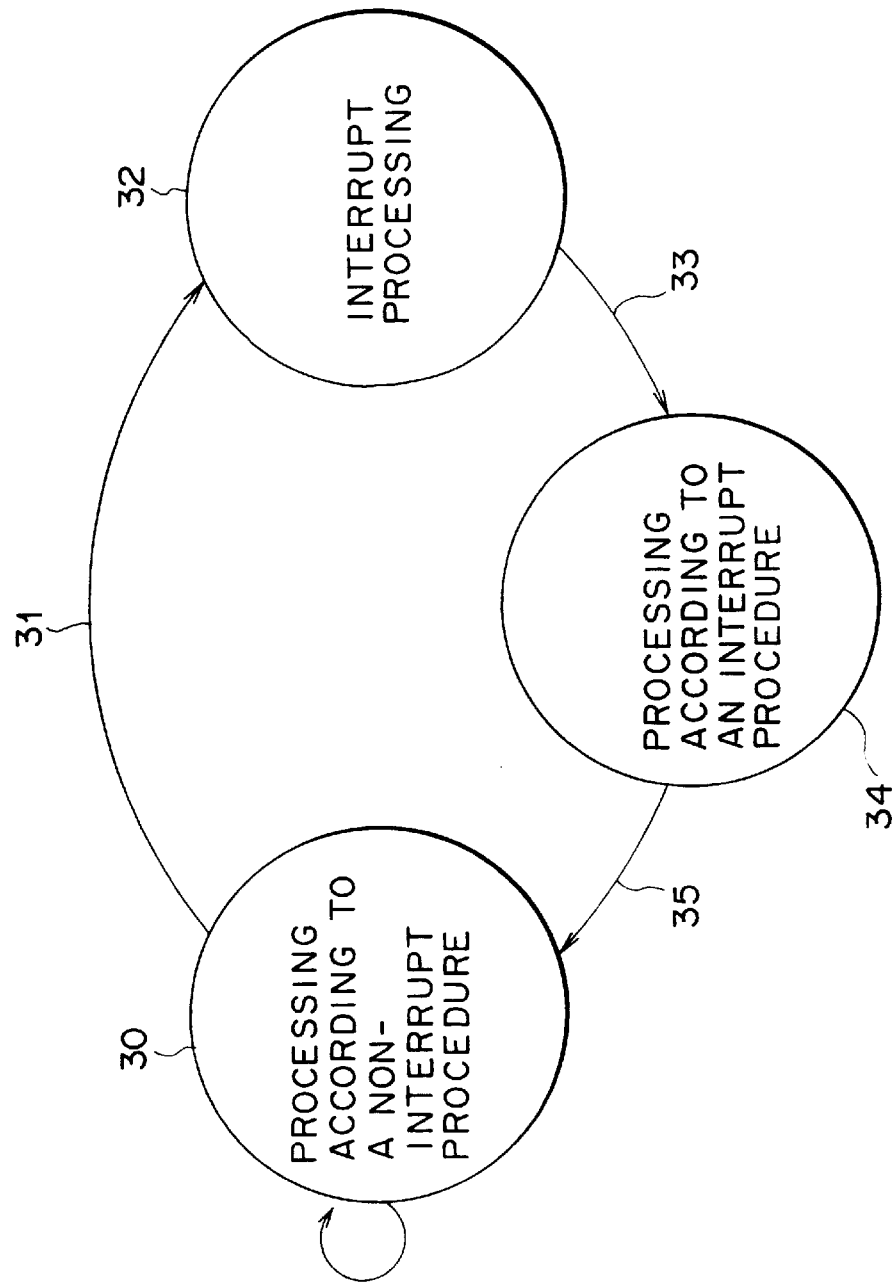
FIG. 4 is a state-transition diagram showing a process to transit to an interrupt processing procedure in the event of an interrupt generated by the input device.

FIG. 4 is a state-transition diagram showing a process to change to an interrupt processing procedure in the event of an interrupt generated by the input device. The process begins with CPU 5 in a state of processing 30 according to a non-interrupt procedure. In the event of an interrupt signal 31 generated in this state 30, the interrupt signal 31 is received by the CPU 5 and the portable radio information terminal 1 changes to a state of processing the interrupt signal 32. In this state 32, an interrupt signal is processed in accordance with an interrupt-signal processing procedure stored in the system memory 22. This procedure begins with identification of an input device that has generated the interrupt signal. An input device generating the interrupt signal can be identified directly from an interrupt receiving terminal that receives the interrupt signal or from information conveyed by the input signal 10A*a* supplied by the interrupt interface 10A to the interrupt-signal processing unit 10B.

After an input device generating the interrupt signal has been identified as described above, that is, after an input device operated by the user has been identified, a state transition 33 shown in FIG. 4 occurs from the interrupt-signal processing state 32 to a processing corresponding to an interrupt handling state 34. In the state 34, an interrupt processing procedure associated with the identified input device is read out from the system memory 22 to be followed in execution of processing to handle the interrupt. Normally, data such as a value entered by the user via the identified input device is confirmed in this processing. At the end of this processing, a transition 35 occurs from the state 34 to the state 30 in which the CPU 5 resumes the non-interrupt processing which was interrupted by the occurrence of the interrupt signal 31. In this resumed processing, the data entered via the interrupting input device can be used.

Next, a variety of means stored in the ROM 6 are explained by referring to FIG. 1.

As shown in the figure, a message time-out control means 26, an input-signal judging means 27 and a messagenotification-operation halting means 28 are each stored in the ROM 6 as a program, that is, a procedure that can be executed by the CPU 5.

The message time-out control means 26 generates a message-notification operation-start signal and, at the same time, starts counting time units at the start of a message-notification operation carried out by a message notifying unit in the event of an incoming call to form a judgment as to whether or not a predetermined end time of the message-notification operation has been reached and to generate a time-out signal as the predetermined end time of the message-notification operation is reached. Assume that the length of the message-notification is set at 20 seconds. In this case, a message time-out occurs as the 20 seconds lapse from the start of the counting of time units.

The input-signal judging means 27 operates upon reception of the message-notification-operation-start signal from the message time-out control means 26 to form a judgment as to whether or not an input signal generated by an input device in the course of a message-notification operation is a rotary input signal generated by the rotary/press input device 39 and supplies a result of the judgment to the message-notification-operation halting means 28.

The message-notification-operation halting means 28 continues the message-notification operation instead of halting the operation, if the result of the judgment received from the input-signal judging means 27 indicates that the input signal is a rotary input signal, but halts the message notifying unit currently carrying out the message-notification operation if the result of the judgment received from the input-signal judging means 27 indicates that the input signal is not a rotary input signal.

As an alternative, the input-signal judging means 27 forms a judgment as to whether or not an input signal generated by an input device is a rotary input signal generated by the rotary/press input device 39 and supplies a signal to the message-notification-operation halting means 28 only if the result of the judgment indicates that the input signal is not a rotary input signal. On the other hand, the message-notification-operation halting means 28 halts the message notifying unit currently carrying out the message-notification operation only if a signal is received from the input-signal judging means 27.

As another alternative, the input-signal judging means 27 and the message-notification-operation halting means 28 can be configured as follows.

The input-signal judging means 27 is activated upon reception of the message-notification-operation-start signal from the message time-out control means 26 to form a judgment as to whether or not an input signal generated by an input device in the course of a message-notification operation is a rotary input signal or an intermittent input signal generated by the rotary/press input device 39 and supplies a result of the judgment to the message-notification-operation halting means 28.

The message-notification-operation halting means 28 continues the message-notification operation instead of halting the operation, if the result of the judgment received from the input-signal judging means 27 indicates that the input signal is a rotary input signal or an intermittent input signal, but halts the message notifying unit currently carrying out the message-notification operation, if the result of the judgment received from the input-signal judging means 27 indicates that the input signal is neither a rotary input signal nor an intermittent input signal.

As a further alternative, the input-signal judging means 27 supplies a signal to the message-notification-operation halting means 28 only if the result of the judgment indicates that the input signal is neither a rotary input signal nor an intermittent input signal. On the other hand, the message-notification-operation halting means 28 halts the message notifying unit currently carrying out the message-notification operation only if a signal is received from the input-signal judging means 27.

Any program format can be used for prescribing the means described above as long as the program can be executed directly or indirectly. It is thus desirable to adopt an absolute-binary addressing format, but a relocatable-binary format which needs readdressing at execution time is also acceptable. In the case of the latter format, however, it is necessary to keep a linkage means in the system memory 22.

FIG. 5 is a diagram showing a front view of the external configuration of the portable radio information terminal 1 implemented by the present embodiment. The configuration of the portable radio information terminal 1 implemented by the embodiment is explained by referring to this figure as follows.

The portable radio information terminal 1 implemented by the present embodiment is accommodated in a thin hexahedron cabinet 15. At about the center of the front face of the cabinet 15, there is provided a liquid-crystal display panel 12 for displaying a message, a date and/or the time of the day.

At the upper right corner of the cabinet 15, a jog dial used as the rotary/press input device 39 described earlier is installed in such a way that a portion of the jog dial protrudes outward from the cabinet 15 to the external side. The rotary/press input device 39 has a knob serving as the rotary input device 9 which can be rotated in the clockwise and counterclockwise directions with a high degree of freedom.

A press switch 8 is assembled with the rotary input device 9 as a single assembly. When the knob of the rotary input device 9 is pressed, the press switch 8 is actuated.

At a position on the lower side adjacent to the liquid-crystal display panel 12, the input switch 16 functioning as an escape key is embedded in such a way that the input switch 16 can be operated by pressing with ease. The input switch 16 is operated by the user to enter a message halting command to stop alarming sound generated as a message indicating an incoming call or a command to control an operation.

The input switch 16 is slightly dented on the surface of the cabinet 15 toward the inner side of the cabinet 15 to form such a structure that an inadvertent external force will never be applied to the switch 16 accidentally. With such a structure, a malfunction can be avoided.

On the liquid-crystal display panel 12, it is possible to display a message text composed of up to typically 4 lines each comprising a maximum of typically 20 alphabetical and numerical characters.

The configuration of the portable radio information terminal 1 implemented by the present embodiment has been described so far. Next, the operation of the portable radio information terminal 1 is explained as follows.

First of all, normal operations to receive a radio signal and to display a message are discussed by referring mainly to FIG. 2.

When an electric wave conveying information or a message destined for a specific portable radio information terminal 1 is transmitted from a radio transmitting station, the portable radio information terminal 1 receives the radio wave using the antenna 2. In the receiver unit 3, the radio wave is subjected to signal processing such as conversion into a signal having an intermediate frequency, amplification and detection. In the demodulation unit 4, after the confirmation that the message is indeed destined for the portable radio information terminal 1 has been made, the received information signal is decoded. The decoded information signal is finally stored in the message storing memory 7 in an operation controlled by the CPU 5.

The CPU 5 controls the operation of the portable radio information terminal 1 by execution of control programs stored in the ROM 6. First of all, the CPU 5 forms a judgment as to whether or not an information signal has been received. If an information signal is judged to have been received, the display-panel driving unit 11 is operated to display a message of the received information signal read out from the message storing memory 7 on the liquid-crystal display panel 12 as a text composed of up to typically 4 lines each comprising a maximum of typically 20 alphabetical and numerical characters.

In addition, when an information signal is judged to have been received, the CPU 5 issues a command to operate the message-signal outputting unit 13. Operated by the command, the message-signal outputting unit 13 supplies an alarm signal to the speaker 14 to generate sound for making the user aware of the fact that an information signal has been received.

Next, the message-notification operation is explained.

Figure 6:
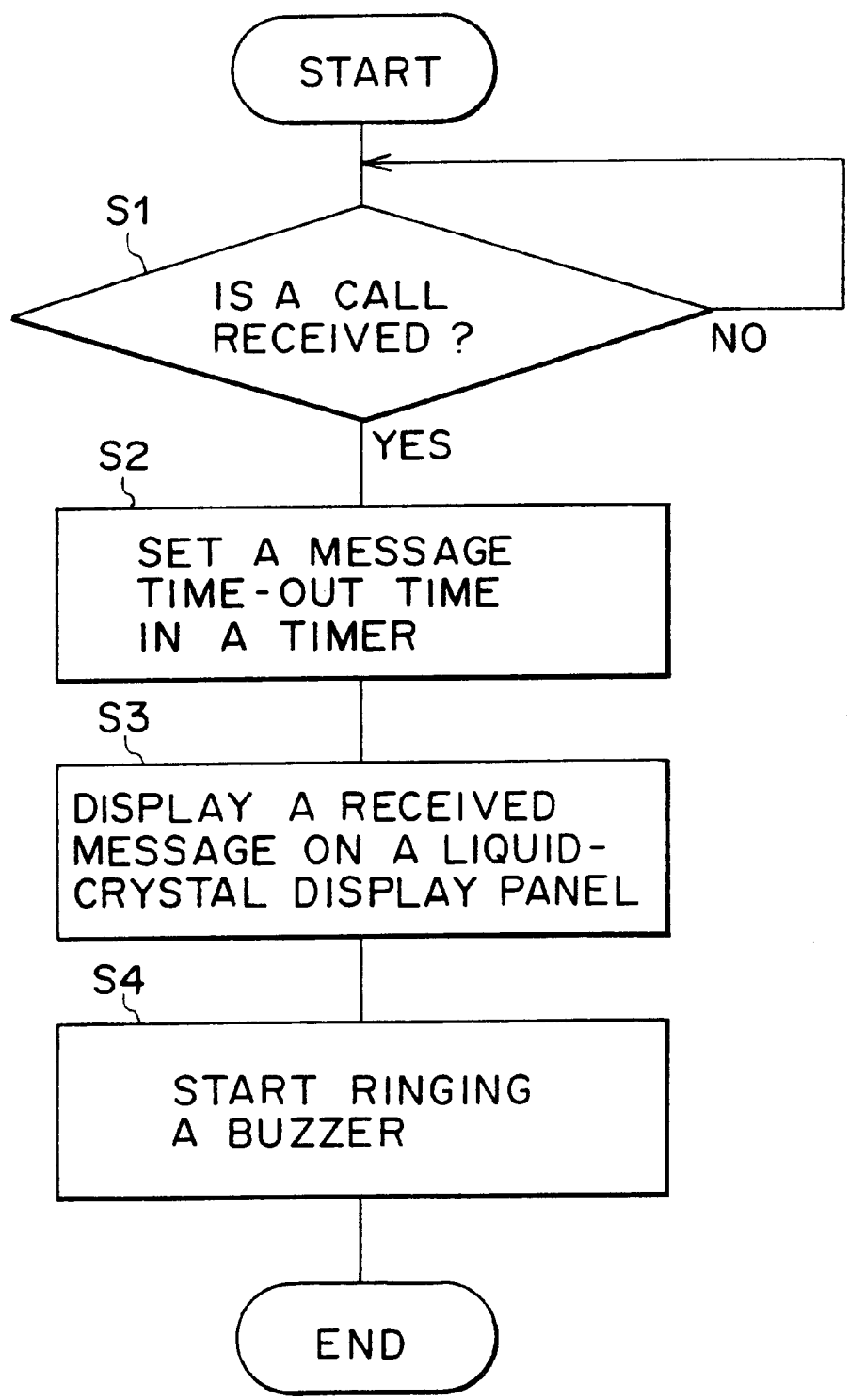
FIG. 6 is a flowchart representing an operation to start a message-notification operation carried out by the portable radio information terminal implemented by the first embodiment of the present invention.

FIG. 6 is a flowchart representing an operation to start message notification carried out by the portable radio information terminal implemented by a first embodiment of the present invention.

As shown in the figure, the flowchart begins with a step S1 at which an incoming call is received. The flow of the operation then goes on to a step S2 at which the message time-out control means 26 sets a time-out time in a timer. Then, the flow of the operation proceeds to a step S3 at which the CPU 5 displays a received message on the liquid-crystal display panel 12. Finally, the flow of the operation continues to a step S4 to start generation of ringing sound of a buzzer as an operation to notify the user of the message.

Figure 7:
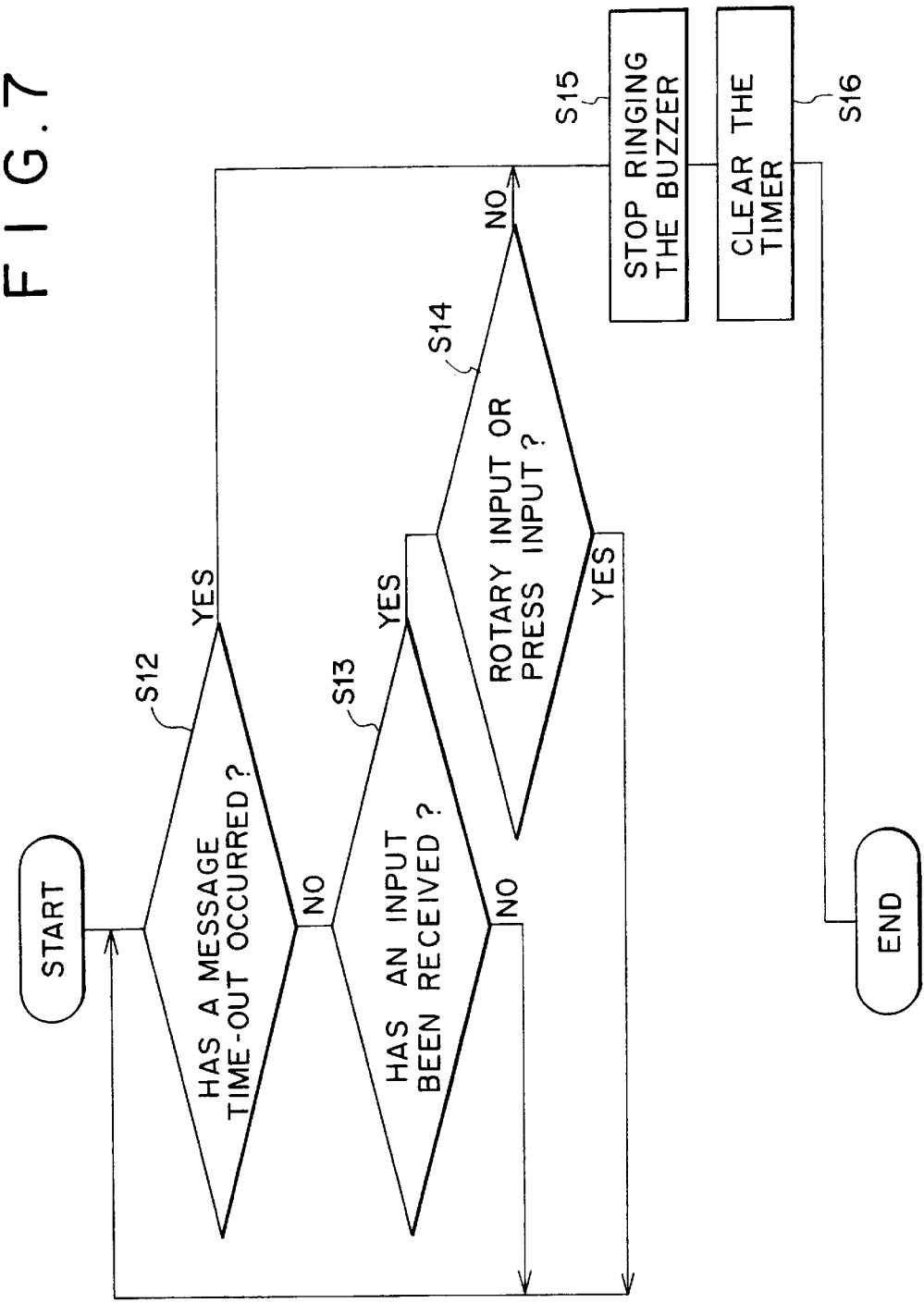
FIG. 7 is a flowchart representing an operation to end a message-notification operation carried out by the portable radio information terminal implemented by the first embodiment of the present invention.

FIG. 7 is a flowchart representing processing to halt a message-notification operation carried out by the portable radio information terminal 1 implemented by the first embodiment of the present invention.

As shown in the figure, the flowchart begins with a step S12 at which the message time-out control means 26 controls the time lapse for message time-out.

If a message time-out has not occurred yet, the flow of the processing goes on to a step S13 at which the input-signal judging means 27 forms a judgment as to whether or not an input signal has been generated by an input device. If an input signal has not been generated, the flow of the processing goes back to the step S12. The processing of the steps S12 and S13 is repeated until a message time-out occurs or an input signal is generated by an input device.

If the outcome of the judgment formed by the input-signal judging means 27 at the step S13 indicates that an input signal has been generated, on the other hand, the flow of the processing proceeds to a step S14 to form a judgment as to whether or not the input signal has been generated by the rotary/press input device 39. If the signal is discriminated as an input signal generated by the rotary/press input device 39, it is ignored and the flow of the processing goes back to the step S12.

If the outcome of the judgment formed at the step S14 indicates that the input signal is not a signal generated by the rotary/press input device 39, on the other hand, the input signal is regarded as a command to halt the message-notification operation. In this case, the flow of the processing continues to a step S15 at which the message-notification-operation halting means 28 operates to halt the ringing sound of the buzzer which has been going on so far.

As described above, when an input signal is received and the input signal is confirmed to be a command to halt the message-notification operation, the message-notification operation is halted right away even if the input signal is received before a message time-out occurs.

In addition, a received input signal other than the input signal determined in advance is judged to be an abnormality. An example of an abnormal input signal is an input signal generated as a result of inadvertent application of an external force to an input device. In the event of such an abnormal input signal, the message-notification operation which is being carried out currently is not halted.

If the outcome of the judgment formed at the step S12 indicates that a message time-out has occurred with no input signal regarded as a command to halt the message-notification operation, on the other hand, the flow of the processing goes on to the step S15 at which the message-notification-operation halting means 28 operates to halt the ringing sound of the buzzer which has been going on so far. The flow of the processing then goes on to a step S16 at which the timer is reset after the message-notification operation is halted regardless of whether the message-notification operation has been halted as instructed by a received input signal or due to occurrence of a message time-out.

Figure 8:
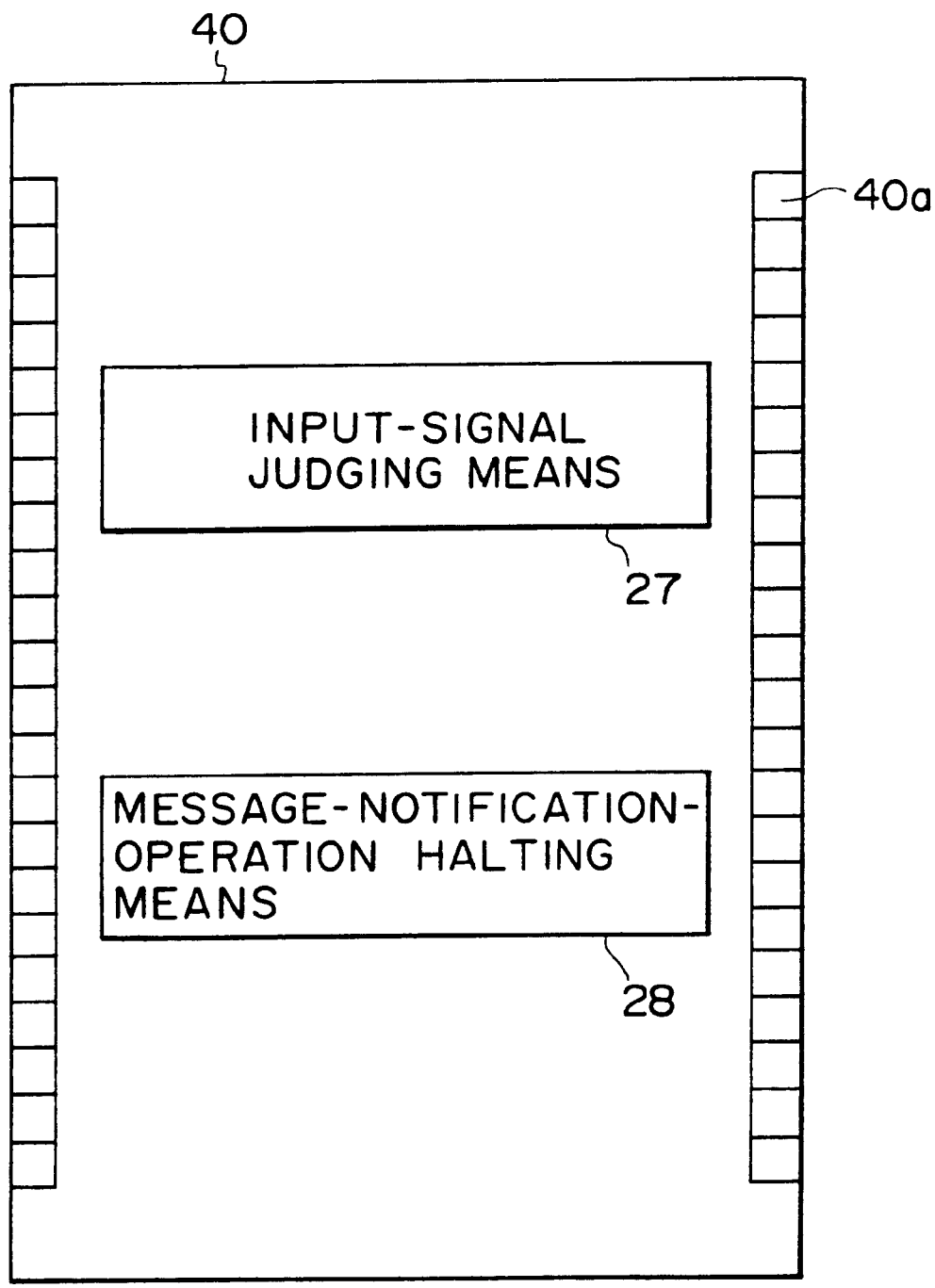
FIG. 8 is an explanatory diagram showing the configuration of a recording medium implemented by a second embodiment of the present invention.

FIG. 8 is an explanatory diagram showing the configuration of a recording medium implemented by a second embodiment of the present invention. The recording medium 40 implemented by the second embodiment of the present invention is explained by referring to this figure as follows.

The recording medium 40 implemented by the second embodiment of the present invention is a single-chip semiconductor memory which includes at least two means described below. The two means are each recorded in the recording medium 40 as a procedure, that is, a program which can be fetched and executed by a computer. The two means can be accessed through chip pins 40a.

The first means recorded on the recording medium 40 is the input-signal judging means 27 described earlier. The first means is fetched for execution by a central processing unit of a computer employed in the portable radio information terminal which is also equipped with an input device, a message displaying unit and a message notifying unit. During the execution, the first input-signal judging means 27 operates to form a judgment as to whether or not an input signal generated by the input device in the course of a message-notification operation carried out by the portable radio information terminal is a predetermined input signal.

The second means is the message-notification-operation halting means 28 described earlier. The second means is fetched for execution by the central processing unit of the computer employed in the portable radio information terminal. During the execution, the message-notification-operation halting means 28 continues the message-notification operation instead of halting the operation if a result of the judgment received from the input-signal judging means 27 serving as the first means indicates that the input signal is the predetermined input signal, but halts the message notifying unit currently carrying out the message-notification operation if the result of the judgment received from the input-signal judging means 27 indicates that the input signal is not the predetermined input signal.

As described above, the recording medium 40 is incorporated in the portable radio information terminal having the computer including the central processing unit, an input device, a message notifying unit, an image displaying unit and a message storing memory for storing operating procedures to be executed by the central processing unit. By letting the central processing unit sequentially execute the two means which are each stored in the recording medium 40 as an operation procedure, it is possible to implement a portable radio information terminal having the functions to form a judgment as to whether or not an input signal generated by the input device in the course of a message-notification operation carried out by the portable radio information terminal is a predetermined input signal continue the message-notification operation instead of halting the operation if a result of the judgment indicates that the input signal is the predetermined input signal, and halt the message notifying unit currently carrying out the message-notification operation if the result of the judgment indicates that the input signal is not the predetermined input signal.

The recording medium 40 provided by this embodiment can be applied to mainly a flash memory. In addition, the recording medium can be applied to a read-only MOS memory, an SRAM, an EPROM, an EEPROM and the other so-called non-volatile semiconductor recording media.

In addition, the recording medium 40 can also be applied to an optical recording medium, an optical magnetic recording medium and a magnetic recording medium as well.

Figure 9:
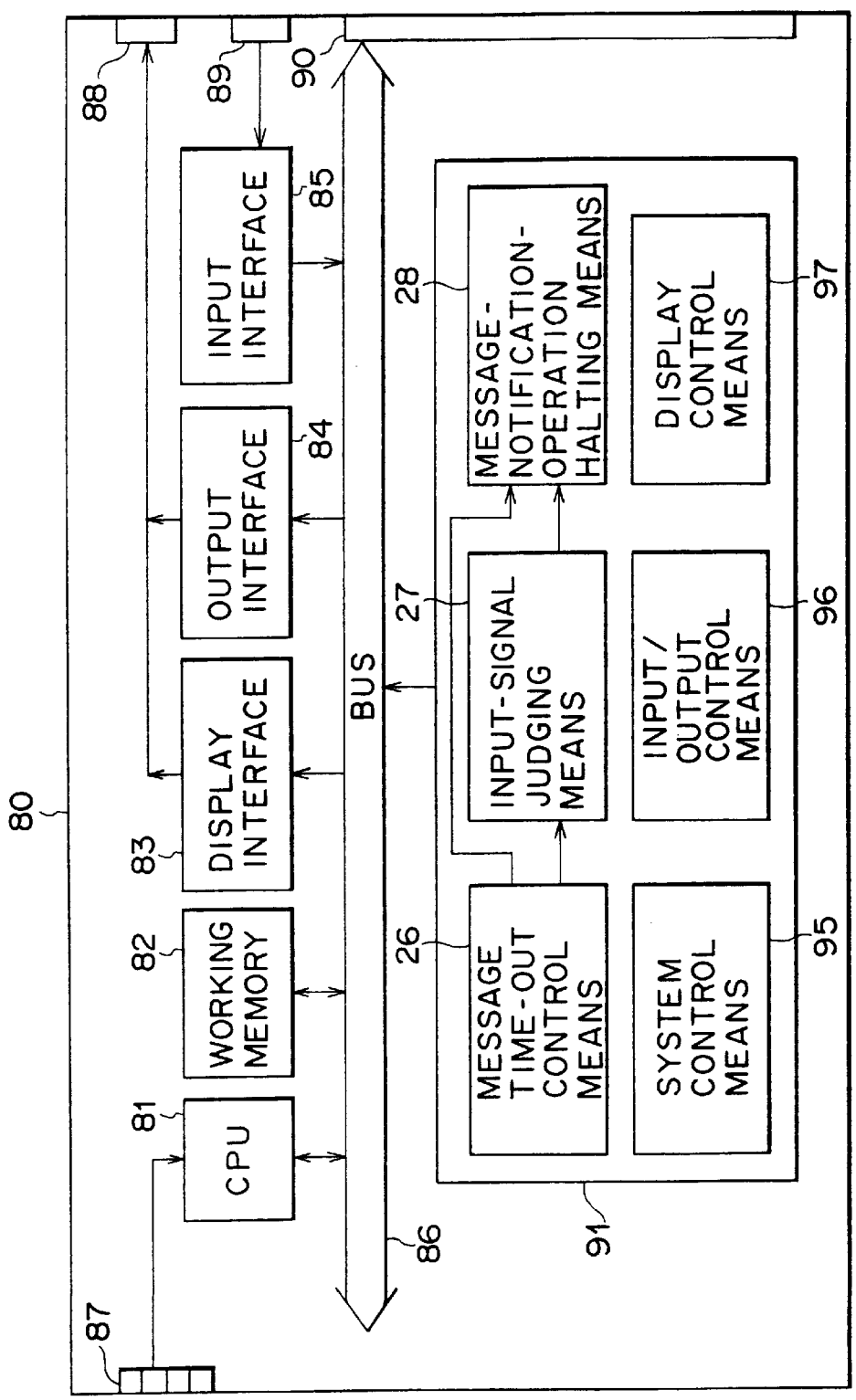
FIG. 9 is a block diagram showing the configuration of a microcomputer implemented by a third embodiment of the present invention.

FIG. 9 is a block diagram showing the configuration of a microcomputer implemented by a third embodiment of the present invention. The microcomputer 80 implemented by the third embodiment of the present invention is explained by referring to FIG. 9 as follows.

Designed into a one-chip product, the microcomputer implemented by the third embodiment of the present invention comprises a CPU (central processing unit) 81, a working memory unit 82, a display interface unit 83, an output interface unit 84, an input interface unit 85 and a memory unit 91 which are connected to each other by an internal bus 86 as shown in the figure.

External pins provided on the single-chip of the microcomputer 80 are interrupt input pins 87 connected to an interrupt input terminal of the CPU 81, output pins 88 connected to the display interface unit 83 and the output interface unit 84, input pins 89 connected to the input interface unit 85 and common bus pins 90 connected to the internal bus 86.

The memory unit 91 is used for storing programs that can be executed by the CPU 81. The programs include a system control means 95, an input/output control means 96, a display control means 97, the message time-out control means 26, the input-signal judging means 27 and the message-notification-operation halting means 28.

The system control means 95 is executed to control not only operations of each component inside the chip of the microcomputer 80, but also operations of the whole portable radio information terminal 1 including the microcomputer 80 itself and operations of components in the portable radio information terminal 1 other than the microcomputer 80. The procedure implemented in this system control means is adapted to the portable radio information terminal provided by the present invention.

By the same token, the input/output control means 96 is executed to control not only exchanges of data and signals among the components inside and outside the chip of the microcomputer 80, but also exchanges of data and signals between the whole portable radio information terminal 1 including the microcomputer 80 itself as well as components in the portable radio information terminal 1 other than the microcomputer 80 and the external world. The procedure implementing this system control means is adapted according to the portable radio information terminal 1 provided by the present invention.

On the other hand, the display control means 97 is executed to control operations to display a message text on a screen on an image displaying unit connected to the microcomputer 80.

Fetched for execution by the CPU (central processing unit) 81, the message time-out control means 26 generates a message-notification operation-start signal and, at the same time, starts counting time units at the start of a message-notification operation carried out by a message notifying unit in the event of an incoming call to form a judgment as to whether or not a predetermined end time of the message-notification operation has been reached and generates a time-out signal as the predetermined end time of the message-notification operation is reached.

Also fetched for execution by the CPU 81, the input-signal judging means 27 operates upon reception of the message-notification operation-start signal from the message time-out control means 26 to form a judgment as to whether or not an input signal generated by an input device in the course of a message-notification operation is a rotary input signal generated by the rotary/press input device 39 and to supply a result of the judgment to the message-notification-operation halting means 28.

Also fetched for execution by the CPU 81, the message-notification-operation halting means 28 continues the message-notification operation instead of halting the operation if the result of the judgment received from the input-signal judging means 27 indicates that the input signal is a rotary input signal, but halts the message notifying unit currently carrying out the message-notification operation if the result of the judgment received from the input-signal judging means 27 indicates that the input signal is not a rotary input signal.

By incorporating the microcomputer 80 in a portable radio information terminal equipped with components including a communication mechanism unit, a memory unit for recording a received message, an input device such as a rotary/press input device used for entering an input command, a message notifying unit, an image displaying unit for displaying information such as a message and a power-supply circuit, it is possible to easily provide the portable radio information terminal with the functions to form a judgment as to whether or not an input signal generated by the input device in the course of a message-notification operation carried out by the portable radio information terminal is a predetermined input signal and to continue the message-notification operation instead of halting the operation if a result of the judgment indicates that the input signal is the predetermined input signal, but to halt the message notifying unit currently carrying out the message-notification operation if the result of the judgment indicates that the input signal is not the predetermined input signal.

Figure 10:
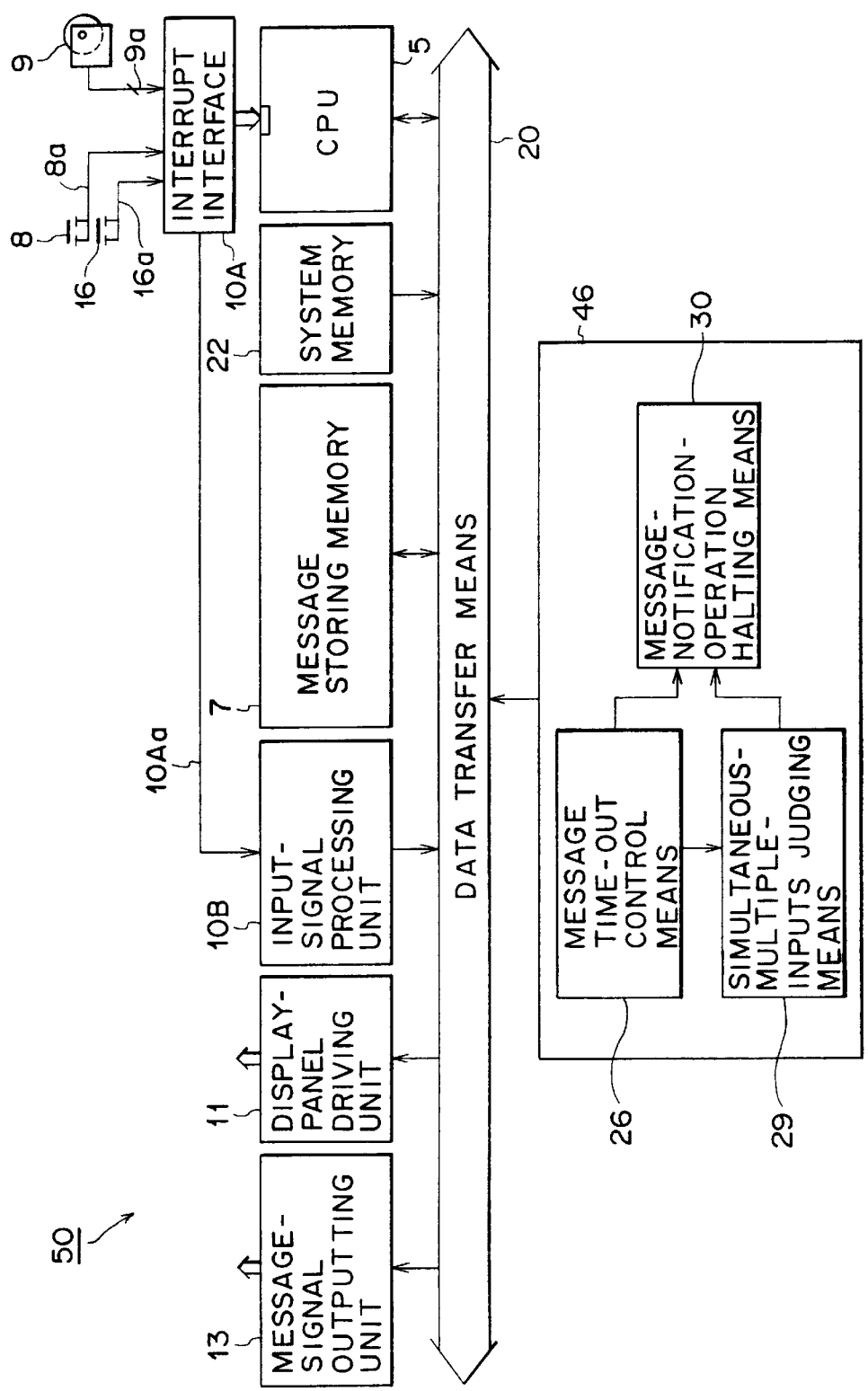
FIG. 10 is a block diagram showing the configuration of main components composing a portable radio information terminal implemented by a fourth embodiment of the present invention.

FIG. 10 is a block diagram showing the configuration of main components composing a portable radio information terminal implemented by a fourth embodiment of the present invention. Components of FIG. 10 identical with those employed in the portable radio information terminal 1 implemented by the first embodiment shown in FIG. 1 are denoted by the same reference numerals as the latter and the explanation of these components is not repeated.

In a ROM (Read-Only Memory) 46 connected to the data transfer means 20 of the portable radio information terminal 50 implemented by the fourth embodiment, the message time-out control means 26, a simultaneous-multiple-inputs judging means 29 and a message-notification-operation halting means 30 are stored each as a procedure, that is, a program which can be executed by the CPU 5.

The message time-out control means 26 is the same as that employed in the portable radio information terminal 1 implemented by the first embodiment.

The simultaneous-multiple-inputs judging means 29 forms a judgment as to whether or not at least two of three input signals, namely, the rotary input signal, the intermittent input signal and the non-rotary input signal, have been generated at the same time in the course of a message-notification operation.

The message-notification-operation halting means 30 halts a message notifying unit currently carrying out a message-notification operation as soon as the simultaneous-multiple-inputs judging means 29 judges that at least two of the three input signals have been generated at the same time.

Figure 11:
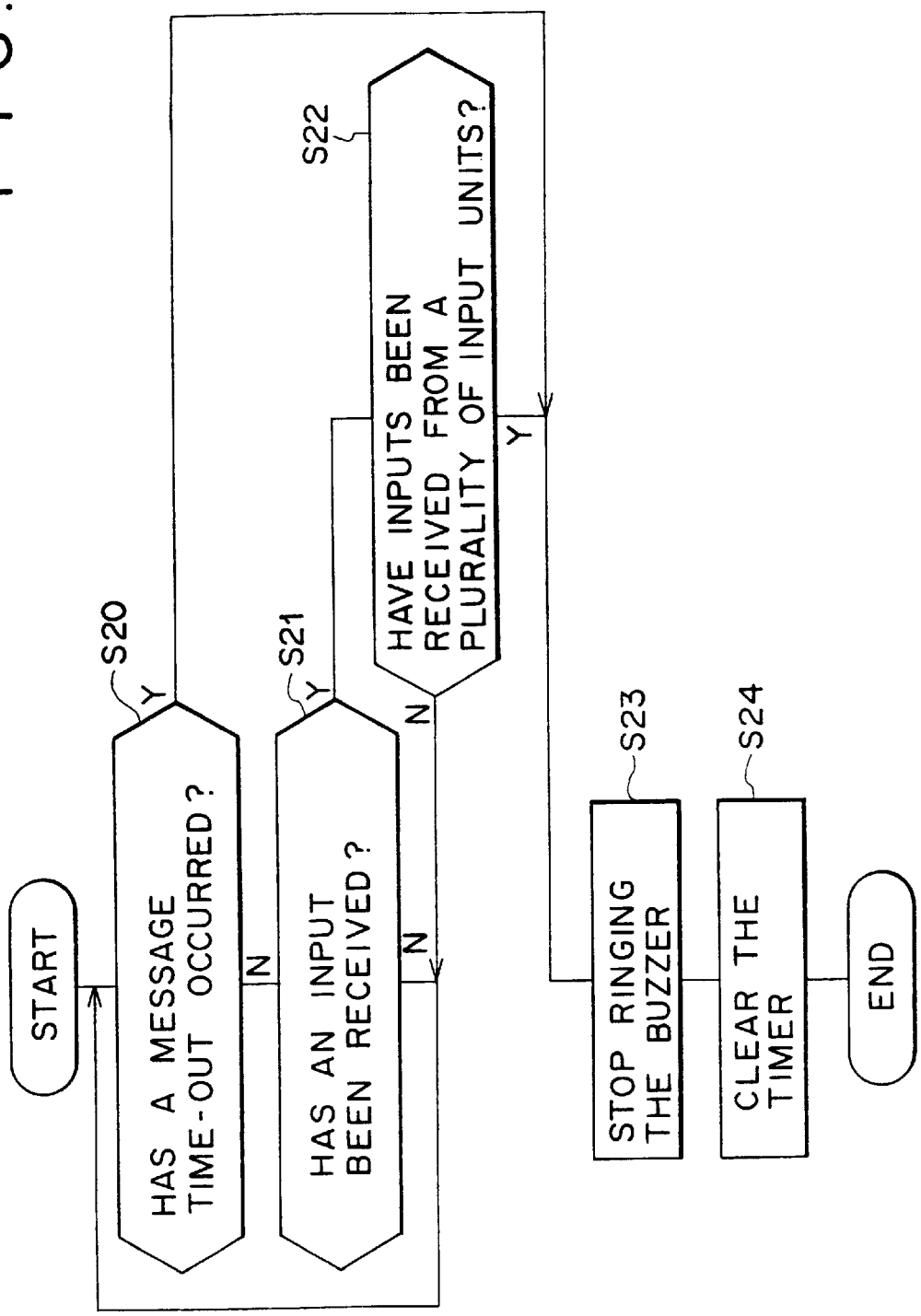
FIG. 11 is a flowchart representing a procedure for halting a message-notification operation carried out by the portable radio information terminal implemented by the fourth embodiment of the present invention.

FIG. 11 is a flowchart representing an image displaying operation carried out by the portable radio information terminal 50 implemented by the fourth embodiment.

As shown in the figure, the flowchart begins with a step S20 at which the message time-out control means 26 controls the time lapse for a message time-out.

If a message time-out has not occurred yet, the flow of the processing goes on to a step S21 at which the simultaneous-multiple-inputs judging means 29 forms a judgment as to whether or not an input signal has been generated by an input device. If an input signal has not been generated, the flow of the processing goes back to the step S20. The processing of the steps S20 and S21 is repeated until a message time-out occurs or an input signal is generated by an input device.

If the outcome of the judgment formed by the simultaneous-multiple-inputs judging means 29 at the step S21 indicates that an input signal has been generated, on the other hand, the flow of the processing proceeds to a step S22 at which the simultaneous-multiple-inputs judging means 29 forms a judgment as to whether or not a plurality of input signals, that is, at least two of three input signals, namely, the rotary input signal, the intermittent input signal and the non-rotary input signal, have been generated at the same time by the plurality of input devices in the course of a message-notification operation. If a plurality of input signals have not been generated at the same time, the generated signals are ignored and the flow of the processing goes back to the step S20 at which the processing is repeated until a message time-out occurs or an input signal is generated by an input device.

If the outcome of the judgment formed at the step S22 indicates that at least two input signals have been generated at the same time, on the other hand, it is recognized that the message-notification-operation halting command signal has generated and the flow of the processing goes on to a step S23 at which the message-notification-operation halting means 30 operates to halt the ringing sound of buzzer which has been going on so far.

In this way, confirmed simultaneous generation of at least two input signals is regarded as a command to halt the message-notification operation even if no message time-out has occurred, accordingly, the message-notification operation is halted.

In addition, a received input signal other than at least two predetermined input signals received at the same time is judged to be an abnormality. An example of an abnormal input signal is an input signal generated as a result of inadvertent application of an external force to an input device. In the event of such an abnormal input signal, the message-notification operation which is being carried out currently is not halted.

If the outcome of the judgment formed at the step S20 indicates that a message time-out has occurred with no input signal regarded as a command to halt the message-notification operation, on the other hand, the flow of the processing goes on to the step S23 at which the message-notification-operation halting means 28 operates to halt the ringing sound of the buzzer which has been going on so far. The flow of the processing then goes on to a step S24 at which the timer is reset after the ringing sound of the buzzer is halted regardless of whether the message-notification operation has been halted as instructed by a plurality of input signals received at the same time or due to occurrence of a time-out.

It is thus obvious that a message-notification operation being currently carried out is halted only if a plurality of input signals, that is, at least two of three input signals, namely, the rotary input signal, the intermittent input signal and the non-rotary input signal, have been generated at the same time by the input device in the course of the message-notification operation.

That is to say, when the user wants to halt the ringing sound of the buzzer, it is necessary for the user to operate at least two different elements of the input device at the same time. For example, it is necessary to press the knob of the rotary/press input device 39 while rotating the knob. As an alternative, it is necessary to operate the input switch 16 used as a non-rotary input unit while rotating the knob of the rotary/press input device 39. As another alternative, it is necessary to operate the input switch 16 and to press the knob of the rotary/press input device 39 at the same time.

Since a plurality of operations need to be carried out at the same time to halt a message-notification operation which has been going on so far as described above, it is possible to implement a highly reliable portable radio information terminal and a message-notification method for the portable radio information terminal. This is because, even if an inadvertent external force is applied to a switch of the input device provided on the surface of the cabinet accommodating the portable radio information terminal, it will not generate two or more input signals at the same time to halt a message-notification operation.

Figure 12:
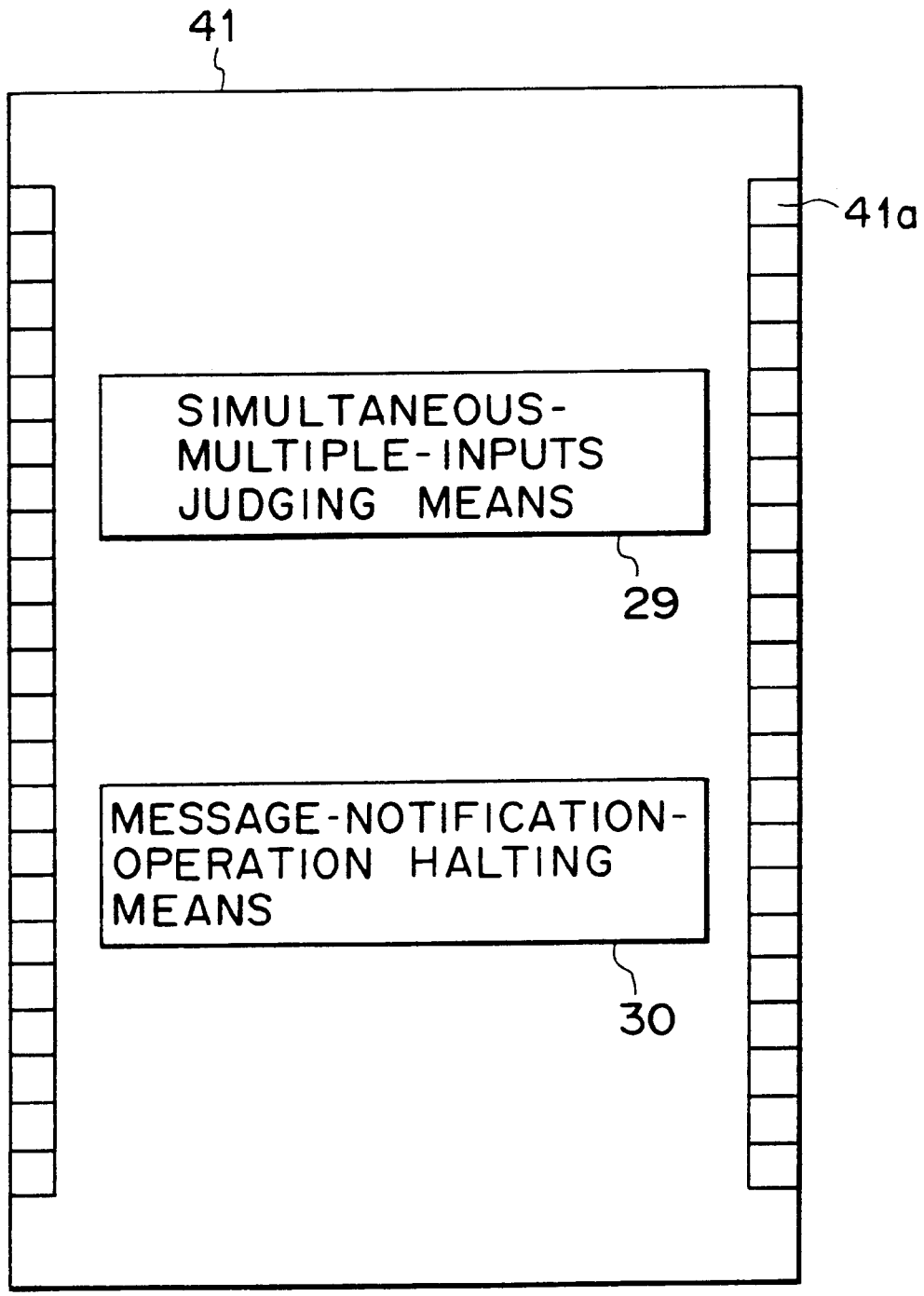
FIG. 12 is an explanatory diagram showing the configuration of a recording medium implemented by a fifth embodiment of the present invention.

FIG. 12 is an explanatory diagram showing the configuration of a recording medium implemented by a fifth embodiment of the present invention. The explanation for components of the recording medium 41 identical with those of the recording medium 40 implemented by the second embodiment shown in FIG. 8 is not repeated.

The recording medium 41 implemented by the fifth embodiment of the present invention is a single-chip semiconductor memory which includes at least two means described below. The two means are each a procedure, that is, a program which can be executed by a computer. The two means can be accessed through chip pins 41a.

The first means recorded on the recording medium 41 is the simultaneous-multiple-inputs judging means 29 described earlier. The first means is fetched for execution by a central processing unit of a computer employed in the portable radio information terminal 50. During the execution, the simultaneous-multiple-inputs judging means 29 operates to form a judgment as to whether or not a plurality of input signals, that is, at least two of the three input signals, namely, the rotary input signal, the intermittent input signal and the non-rotary input signal, have been generated at the same time by the input device in the course of a message-notification operation.

The second means is the message-notification-operation halting means 30 described earlier. The second means is fetched for execution by the central processing unit of the computer employed in the portable radio information terminal 50. During the execution, the message-notification-operation halting means 30 halts the message notifying unit currently carrying out the message-notification operation right away if the result of the judgment received from the simultaneous-multiple-inputs judging means 29 indicates at least two of the three input signals have been generated at the same time by the input device in the course of a message-notification operation.

As described above, the recording medium 41 is incorporated in the portable radio information terminal having the computer including the central processing unit, an input device, a message notifying device, an image displaying unit and a message storing memory unit 91 as a memory for storing operating procedures to be executed by the central processing unit. By letting the central processing unit sequentially execute the two means which are each stored in the recording medium 41 as a procedure, it is possible to implement the portable radio information terminal 50 having the functions to form a judgment as to whether or not at least two input signals have been generated at the same time by the input device in the course of a message-notification operation carried out by the portable radio information terminal 50 and to continue the message-notification operation instead of halting the operation if a result of the judgment indicates that at least two input signals have not been generated at the same time, but to halt the message notifying unit currently carrying out the message-notification operation right away if the result of the judgment indicates that at least 2 input signals have been generated at the same time.

The recording medium 41 provided by this embodiment can be applied to mainly a flash memory. In addition, the recording medium can be applied to a read-only MOS memory, an SRAM, an EPROM, an EEPROM and the other so-called non-volatile semiconductor recording mediums.

In addition, the recording medium 41 can also be applied to an optical recording medium, an optical magnetic recording medium and a magnetic recording medium as well.

Figure 13:
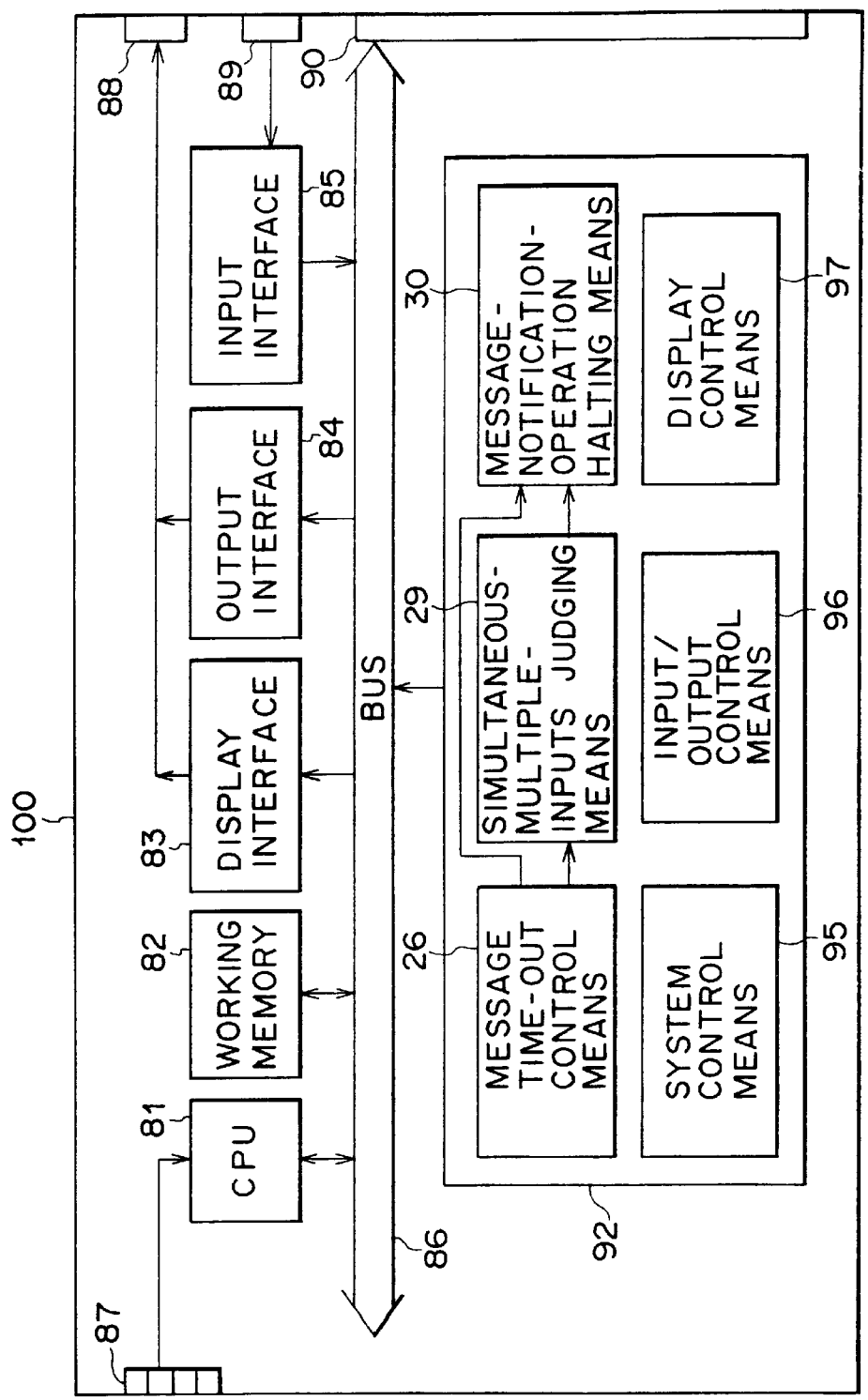
FIG. 13 is a block diagram showing the configuration of a microcomputer implemented by a sixth embodiment of the present invention.

FIG. 13 is block diagram showing the configuration of a microcomputer implemented by a sixth embodiment of the present invention. Components of the microcomputer identical with those of the microcomputer 80 implemented by the third embodiment shown in FIG. 9 are denoted by the same reference numerals as the latter and their explanation is not repeated.

The memory unit 92 is used for storing programs that can be executed by the CPU 81. The programs include a system control means 95, an input/output control means 96, a display control means 97, the message time-out control means 26, the simultaneous-multiple-inputs judging means 29 and the message-notification-operation halting means 30.

The system control means 95, the input/output control means 96 and the display control means 97 are the same as their counterparts employed in the chip of the microcomputer 80 implemented by the third embodiment.

Fetched for execution by the CPU 81, the message time-out control means 26 generates a message-notification operation-start signal and, at the same time, starts counting time units at the start of a message-notification operation carried out by a message notifying unit in the event of an incoming call to form a judgment as to whether or not a predetermined end time of the message-notification operation has been reached and to generate a time-out signal as the predetermined end time of the message-notification operation is reached.

Also fetched for execution by the CPU 81, the simultaneous-multiple-inputs judging means 29 operates upon reception of the message-notification operation-start signal from the message time-out control means 26 to form a judgment as to whether or not a plurality of input signals, that is, at least two of the three input signals, namely, the rotary input signal, the intermittent input signal and the non-rotary input signal, have been generated at the same time by the input device in the course of a message-notification operation and to supply a result of the judgment to the message-notification-operation halting means 30.

Also fetched for execution by the CPU 81, the message-notification-operation halting means 30 continues the message-notification operation as it is instead of halting the operation if the result of the judgment received from the simultaneous-multiple-inputs judging means 29 indicates that at least two of the input signals have not been generated at the same time, but halts the message notifying unit currently carrying out the message-notification operation if the result of the judgment received from the simultaneous-multiple-inputs judging means 29 indicates that at least two of the input signals have been generated.

By incorporating the microcomputer 100 in a portable radio information terminal equipped with components including a communication mechanism unit, a memory for recording a received message, an input device such as a rotary/press input device used for entering an input command, a message notifying unit, an image displaying unit for displaying information such as a message and a power-supply circuit, it is possible to easily provide the portable radio information terminal with the functions to form a judgment as to whether or not at least two input signals have been generated by the input device at the same time in the course of a message-notification operation carried out by the message notifying unit and to halt the message notifying unit currently carrying out the message-notification operation right away if the result of the judgment indicates that at least two input signals have been generated at the same time.

What is claimed is:

1. A message-notification method for a portable radio information terminal having rotary/press input means including a rotary operation unit for generating a rotary input signal and a press operation unit for generating an intermittent signal, said message-notification method comprising the steps of:

generating, in an event of an incoming information signal conveyed by a radio wave, a message indicating arrival of said information signal; and carrying out a message-notification operation, whereby said message-notification operation is halted when at least said rotary input signal and said intermittent signal are generated at a same time during said message-notification operation.

2. A message-notification method for a portable radio information terminal having rotary/press input means including a rotary operation unit for generating a rotary input signal and a press operation unit for generating an intermittent signal and a non-rotary input means for generating a non-rotary input signal resulting from a non-rotary operation carried out on said non-rotary input means, said message-notification method comprising the steps of:

generating, in an event of an incoming information signal conveyed by a radio wave, a message indicating an arrival of said information signal; and carrying out a message-notification operation, whereby said message-notification operation is halted when at least two of said rotary input signal, said intermittent signal, and said non-rotary input signal are generated at a same time during said message-notification operation.

3. A portable radio information terminal comprising:

a message notifying unit for carrying out a message-notification operation and outputting a message indicating an arrival of an information signal conveyed by an incoming radio wave;

an image displaying unit for displaying said message indicating said arrival of said information signal;

an input device operated by a user for entering a control command, said input device including at least rotary/press input means having a rotary operation unit for generating a rotary input signal and a press operation unit for generating an intermittent input signal;

simultaneous-multiple-inputs judging means for judging whether said rotary input signal and said intermittent signal have been generated at a same time during said message-notification operation; and message-notification-operation halting means for continuing said message-notification operation if a judgment formed by said simultaneous-multiple-inputs judging means indicates that said rotary input signal and said intermittent signal have not been generated at said same time during said message-notification operation and for halting said message-notification operation if said judgment formed by said simultaneous-multiple-inputs judging means indicates that said rotary input signal and said intermittent signal have been generated at said same time during said message-notification operation.

4. The portable radio information terminal according to claim 3, further comprising non-rotary input means for generating a non-rotary input signal resulting from a non-rotary operation carried out on said non-rotary input means.

5. A portable radio information terminal comprising:

a message notifying unit for carrying out a message-notification operation and outputting an message indicating an arrival of an information signal conveyed by an incoming radio wave;

an image displaying unit for displaying said message indicating said arrival of said information signal;

an input device operated by a user for entering a control command, said input device including at least a rotary/press input means having a rotary operation unit for generating a rotary input signal and a press operation unit for generating an intermittent input signal and at least a non-rotary input means for generating a non-rotary input signal resulting from a non-rotary operation carried out on said non-rotary input means;

simultaneous-multiple-inputs judging means for judging whether at least two of said rotary input signal, said intermittent input signal, and said non-rotary input signal have been generated at a same time during said message-notification operation; and message-notification-operation halting means for continuing said message-notification operation if a judgment formed by said simultaneous-multiple-input judging means indicates that two of said rotary input signal, said intermittent input signal, and said non-rotary input signal have not been generated at said same time during said message-notification operation and for halting said message-notification operation if said judgment formed by said simultaneous-multiple-input judging means indicates that at least two of said rotary input signal, said intermittent input signal and said non-rotary input signal have been generated at said same time during said message-notification operation.

6. A record medium for recording each of two means as a program fetchable and executable by a computer employed in a portable radio information terminal including:

a message notifying unit for carrying out a message-notification operation and outputting a message indicating an arrival of an information signal conveyed by an incoming radio wave;

an image displaying unit for displaying said message indicating said arrival of said information signal; and rotary/press input means having a rotary operation unit for generating a rotary input signal and a press operation unit for generating an intermittent input signal, said two means comprising:

simultaneous-multiple-inputs judging means for judging wether said rotary input signal and said intermittent input signal have been generated at a same time during said message-notification operation; and message-notification-operation halting means for continuing said message-notification operation if a judgment formed by said simultaneous-multiple-inputs judging means indicates that said rotary input signal and said intermittent input signal have not been generated at said same time during said message-notification operation and for halting said message-notification operation if said judgment formed by said simultaneous-multiple-inputs judging means indicates that said rotary input signal and said intermittent input signal have been generated at said same time during said message-notification operation.

7. The recording medium according to claim 6, wherein said portable radio information terminal further includes non-rotary input means for generating a non-rotary input signal resulting from a non-rotary operation carried out on said non-rotary input means.

8. A recording medium for recording each of two means as a program fetchable and executable by a computer employed in a portable radio information terminal including:

a message notifying unit for carrying out a message-notification operation and outputting a message indicating an arrival of an information signal conveyed by an incoming radio wave;

an image displaying unit for displaying said message indicating said arrival of said information signal;

rotary/press input means having a rotary operation unit for generating a rotary input signal and a press operation unit for generating an intermittent input signal; and non-rotary input means for generating a non-rotary input signal resulting from a non-rotary operation carried out on said non-rotary input means;

said two means comprising:
  simultaneous-multiple-inputs judging means for judging whether at least two of said rotary input signal, said intermittent input signal, and said non-rotary input signal have been generated at a same time during said message-notification operation; and
  message-notification-operation halting means for continuing said message-notification operation if a judgment formed by said simultaneous-multiple-inputs judging means indicates that at least two of said rotary input signal, said intermittent input signal, and said non-rotary input signal have not been generated at said same time during said message-notification operation and for halting said message-notification operation if said judgement formed by said simultaneous-multiple-inputs judging means indicates that at least two of said rotary input signal, said intermittent input signal, and said non-rotary input signal have been generated at said same time during said message-notification operation.

9. A microcomputer system comprising:
  an embedded central processing unit;
  an embedded storage unit for storing programs as procedures fetchable and executable by said embedded central processing unit; and
  embedded data transfer means connectable to external equipment and for connecting to said central processing unit and said storage unit, wherein
    said microcomputer transmits a signal based on a processing result output by said central processing unit to said external equipment by one of radio communication and wire communication and wherein
      said microcomputer is employed in a portable radio information terminal including:
        a message notifying unit for carrying out a message-notification operation and outputting a message indicating an arrival of an information signal conveyed by an incoming radio wave;
        an image displaying unit for displaying said message indicating said arrival of said information signal; and
        a rotary/press input means having a rotary operation unit for generating a rotary input signal and a press operation unit for generating an intermittent input signal; and
      said programs stored in said embedded storage unit include:
        simultaneous-multiple-inputs judging means for judging whether said rotary input signal and said intermittent input signal have been generated at a same time during said message-notification operation; and
        message-notification-operation halting means for continuing said message-notification operation if a judgment formed by said simultaneous-multiple-inputs judging means indicates that said rotary input signal and said intermittent input signal have not been generated at a same time during message-notification operation and for halting said message-notification if said judgment formed by said simultaneous-multiple-inputs judging means indicates that said rotary input signal and said intermittent input signal have been generated at said same time during said message-notification operation.

10. The microcomputer according to claim 9, further comprising non-rotary input means for generating a non-rotary input signal resulting from a non-rotary operation carried out on said non-rotary input means.

11. A microcomputer system comprising:
  an embedded central processing unit;
  an embedded storage unit for storing programs as procedures fetchable and executable by said embedded central processing unit; and
  embedded data transfer means connectable to an external equipment and for connecting to said embedded central processing unit and said embedded storage unit, wherein
    said microcomputer transmits a signal based on a processing result output by said embedded central processing unit to said external equipment by one of radio communication and wire communication, and wherein
      said microcomputer is employed in a portable radio information terminal including:
        a message notifying unit for carrying out a message-notification operation for outputting a message indicating an arrival of an information signal conveyed by an incoming radio wave;
        an image displaying unit for displaying said message indicating said arrival of said information signal; rotary/press input means having a rotary operation unit for generating a rotary input signal and a press operation unit for generating an intermittent input signal; and
        non-rotary input means for generating a non-rotary input signal resulting from a non-rotary operation carried out on said non-rotary input means; and
      said programs stored in said storage unit at least include:
        simultaneous-multiple-inputs judging means for judging whether at least two of said rotary input signal, said intermittent input signal, and said non-rotary input signal have been generated at a same time during said message-notification operation; and
        message-notification-operation halting means f or continuing said message-notification operation if a judgment formed by said simultaneous-multiple-inputs judging means indicates that two of said rotary input signal, said intermittent input signal, and said non-rotary input signal have not been generated at said same time during said message-notification operation and for halting said message notification operation if said judgment formed by said simultaneous-multiple-inputs judging mans indicates that at least two of said rotary input signal, said intermittent input signal, and said non-rotary input signal have been generated at said same time during message-notification operation.

* * * * *